(12) United States Patent
Csik et al.

(10) Patent No.: US 8,353,649 B2
(45) Date of Patent: Jan. 15, 2013

(54) APPARATUS AND METHODS FOR SECURING A FASTENER

(75) Inventors: Terrence Csik, Pasadena, CA (US); Igor Komsitsky, Los Angeles, CA (US)

(73) Assignee: The Monadnock Company, City of Industry, CA (US)

( * ) Notice: Subject to any disclaimer, the term of this patent is extended or adjusted under 35 U.S.C. 154(b) by 80 days.

(21) Appl. No.: 11/875,812

(22) Filed: Oct. 19, 2007

(65) Prior Publication Data
US 2009/0103997 A1    Apr. 23, 2009

(51) Int. Cl.
*F16B 39/284* (2006.01)

(52) U.S. Cl. ........ 411/111; 411/108; 411/908; 411/965; 411/970

(58) Field of Classification Search ............ 411/81, 411/102–104, 108, 111–113, 190, 204, 904, 411/907–909, 965, 970, 964; 24/297, 453, 24/457, 458; 403/353
See application file for complete search history.

(56) References Cited

U.S. PATENT DOCUMENTS

| | | | |
|---|---|---|---|
| 910,712 A | | 1/1909 | McCoy |
| 2,144,350 A | * | 1/1939 | Swanstrom ............... 411/84 |
| 2,144,553 A | | 1/1939 | Oliver |
| 2,344,102 A | | 3/1944 | Meisterhans |
| 2,409,209 A | * | 10/1946 | Johnson ................ 411/111 |
| 2,421,278 A | | 5/1947 | Luce |
| 2,469,311 A | * | 5/1949 | Poupitch ................ 411/84 |
| 2,477,429 A | * | 7/1949 | Swanstrom et al. .......... 411/111 |
| 2,875,805 A | * | 3/1959 | Flora ..................... 411/111 |
| 2,991,816 A | | 7/1961 | Harbison et al. |
| 3,020,946 A | | 2/1962 | Mills |
| 3,217,772 A | | 11/1965 | Adams |
| 3,219,086 A | * | 11/1965 | Zahodiakin .............. 411/112 |
| 3,259,165 A | * | 7/1966 | Tobian et al. ............ 411/85 |
| 3,356,404 A | * | 12/1967 | Peters ................. 403/408.1 |
| 3,478,801 A | | 11/1969 | Van Niel |
| 3,700,020 A | * | 10/1972 | Wallace ................. 411/512 |
| 4,094,352 A | | 6/1978 | Hlinsky |
| 4,193,435 A | * | 3/1980 | Frosch et al. ........... 411/113 |

(Continued)

FOREIGN PATENT DOCUMENTS

CH              482 929        12/1969

(Continued)

OTHER PUBLICATIONS

WIPO, Notification of Transmittal of ISR and Written Opinion of ISA, Search Report, PCT/US2008/066792, Sep. 16, 2008.

*Primary Examiner* — Roberta Delisle

(74) *Attorney, Agent, or Firm* — Henricks, Slavin & Holmes LLC

(57) ABSTRACT

A nut plate assembly and a method for securing a nut plate assembly may include a support for a fastener element wherein the support has a base to be supported and/or fixed on a support surface and the base has another surface against which the fastener element bears. The base also supports a structure for supporting the fastener element where the structure is at least partly non-symmetrical about a plane other than a horizontal plane parallel to the base. One side of the base may be secured to the support surface and the other side of the base may have the fastener element bearing against it when a complementary fastener element is secured to the first fastener element.

43 Claims, 12 Drawing Sheets

U.S. PATENT DOCUMENTS

| | | | |
|---|---|---|---|
| 4,219,064 A | 8/1980 | Lozano | |
| 4,695,212 A | 9/1987 | Berecz | |
| 4,730,967 A | 3/1988 | Warkentin | |
| 4,755,090 A * | 7/1988 | Macfee et al. | 411/82 |
| 4,768,907 A | 9/1988 | Gauron | |
| 4,863,327 A | 9/1989 | Poupiter | |
| 4,895,484 A | 1/1990 | Wilcox | |
| 4,929,116 A * | 5/1990 | Mahl | 403/263 |
| 4,973,208 A | 11/1990 | Gauron | |
| 5,022,804 A * | 6/1991 | Peterson | 411/104 |
| 5,067,863 A | 11/1991 | Kowalski | |
| 5,154,385 A | 10/1992 | Lindberg et al. | |
| 5,190,423 A | 3/1993 | Ewing | |
| 5,193,868 A | 3/1993 | O'Toole | |
| 5,245,743 A | 9/1993 | Landy et al. | |
| 5,324,146 A | 6/1994 | Parenti et al. | |
| 5,378,099 A | 1/1995 | Gauron | |
| 5,489,173 A | 2/1996 | Hofle | |
| 5,507,610 A * | 4/1996 | Benedetti et al. | 411/339 |
| 5,630,686 A | 5/1997 | Billmann | |
| 5,632,582 A | 5/1997 | Gauron | |
| 5,716,178 A | 2/1998 | Vu | |
| 5,820,322 A | 10/1998 | Hermann et al. | |
| 5,928,711 A * | 7/1999 | Wallace et al. | 427/8 |
| 5,947,518 A * | 9/1999 | Redman et al. | 280/781 |
| 6,142,892 A * | 11/2000 | Dennis | 473/494 |
| 6,146,071 A * | 11/2000 | Norkus et al. | 411/104 |
| 6,474,917 B2 | 11/2002 | Gauron | |
| 6,594,870 B1 * | 7/2003 | Lambrecht et al. | 24/297 |
| 6,715,185 B2 * | 4/2004 | Angellotti | 24/297 |
| 6,726,117 B2 | 4/2004 | Herb et al. | |
| 6,854,941 B2 | 2/2005 | Csik | |
| 6,918,725 B2 | 7/2005 | Gauron | |
| 7,044,701 B2 | 5/2006 | Hereb | |
| 7,128,511 B2 | 10/2006 | Hewgill | |
| 7,165,371 B2 * | 1/2007 | Yoyasu | 52/716.5 |
| 7,178,855 B2 * | 2/2007 | Catron et al. | 296/146.7 |
| 7,192,231 B2 * | 3/2007 | Blackaby | 411/111 |
| 7,309,200 B2 | 12/2007 | Schmieder et al. | |
| 2004/0013492 A1 * | 1/2004 | Clinch et al. | 411/112 |
| 2004/0165965 A1 | 8/2004 | Unverzagt et al. | |
| 2004/0202523 A1 * | 10/2004 | Csik | 411/112 |
| 2008/0310931 A1 | 12/2008 | Csik et al. | |
| 2009/0103997 A1 * | 4/2009 | Csik et al. | 411/112 |
| 2009/0129885 A1 | 5/2009 | Csik et al. | |

FOREIGN PATENT DOCUMENTS

| | | |
|---|---|---|
| GB | 565192 | 10/1944 |
| GB | 585948 | 3/1947 |
| GB | 782428 | 9/1957 |
| JP | 2006-38201 | 2/2006 |

* cited by examiner

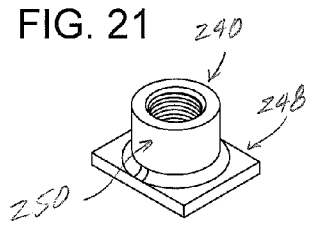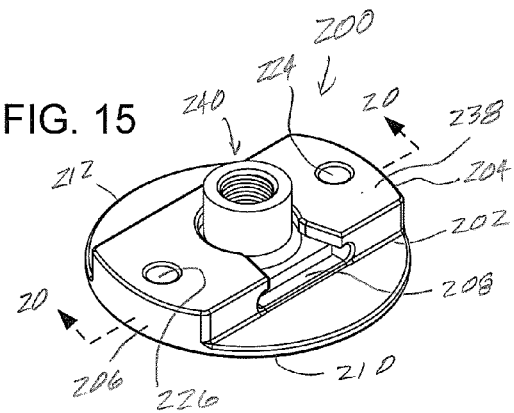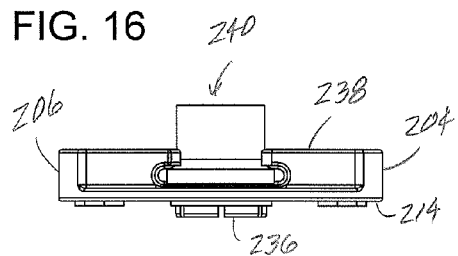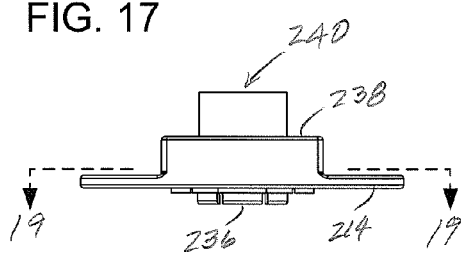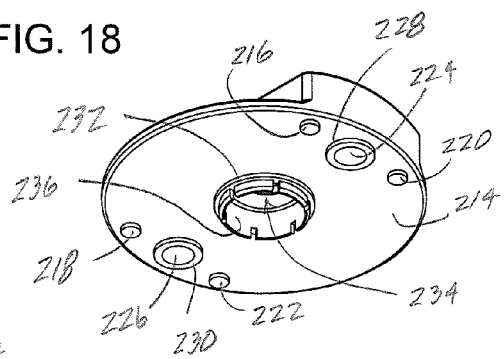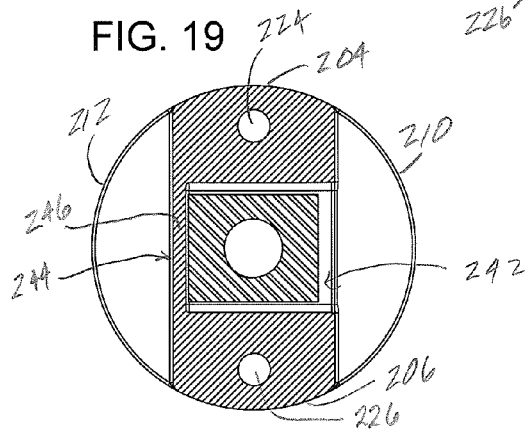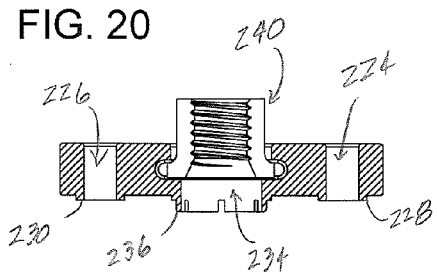

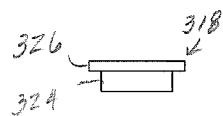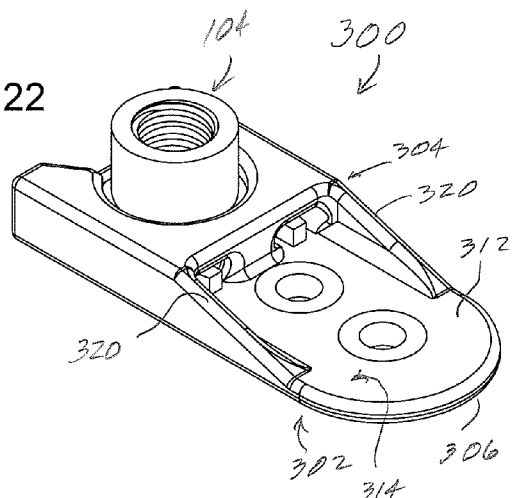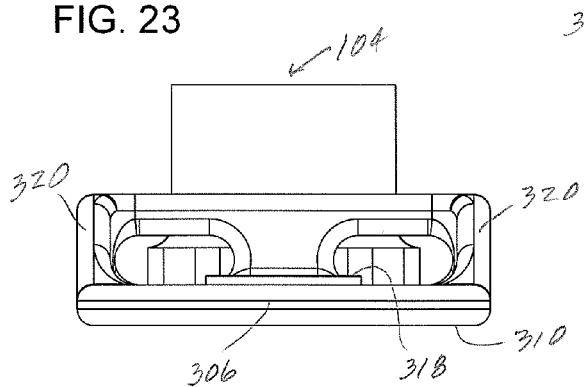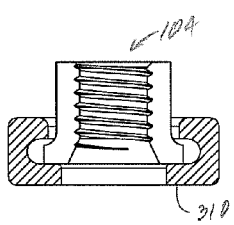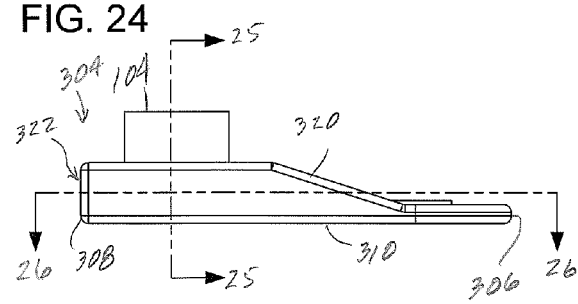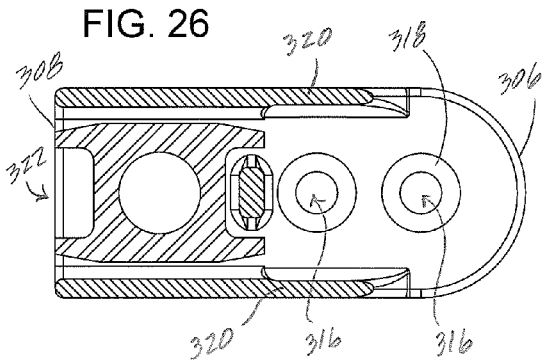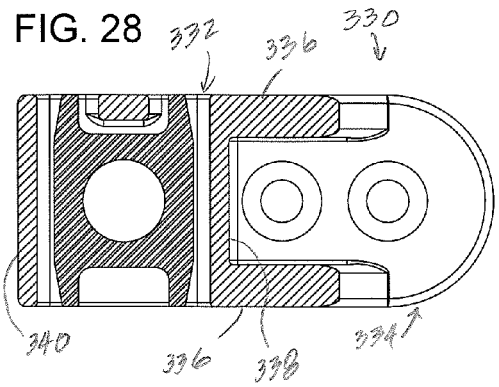

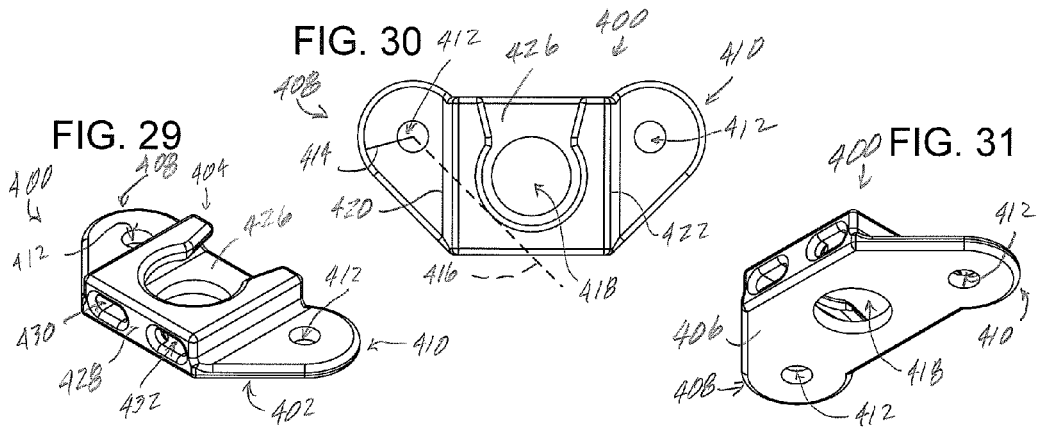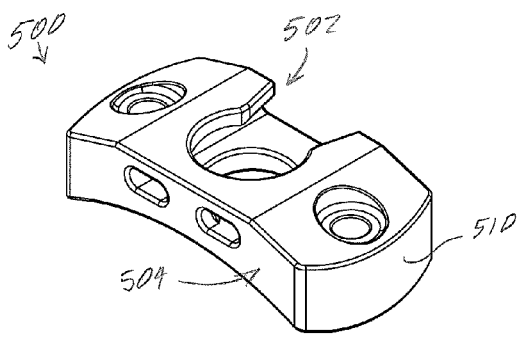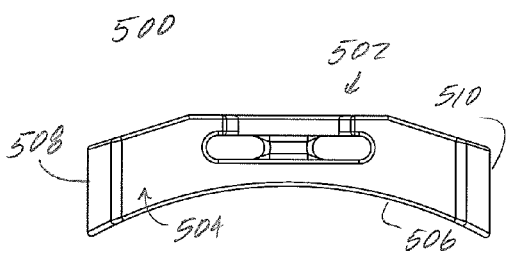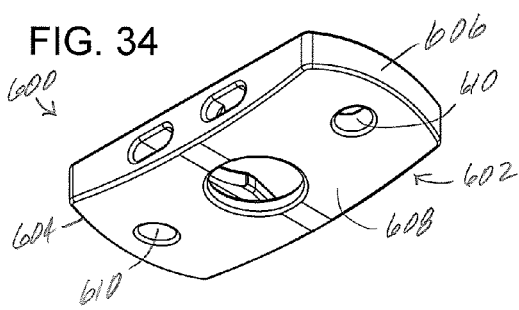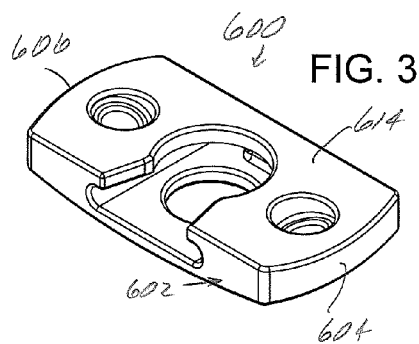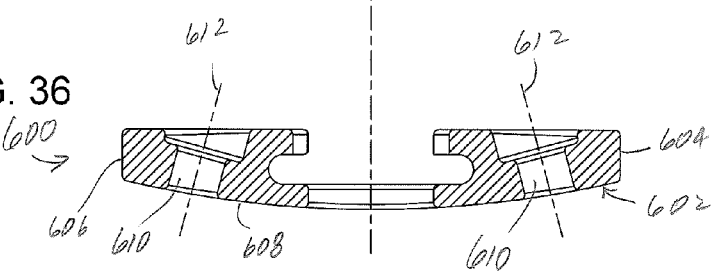

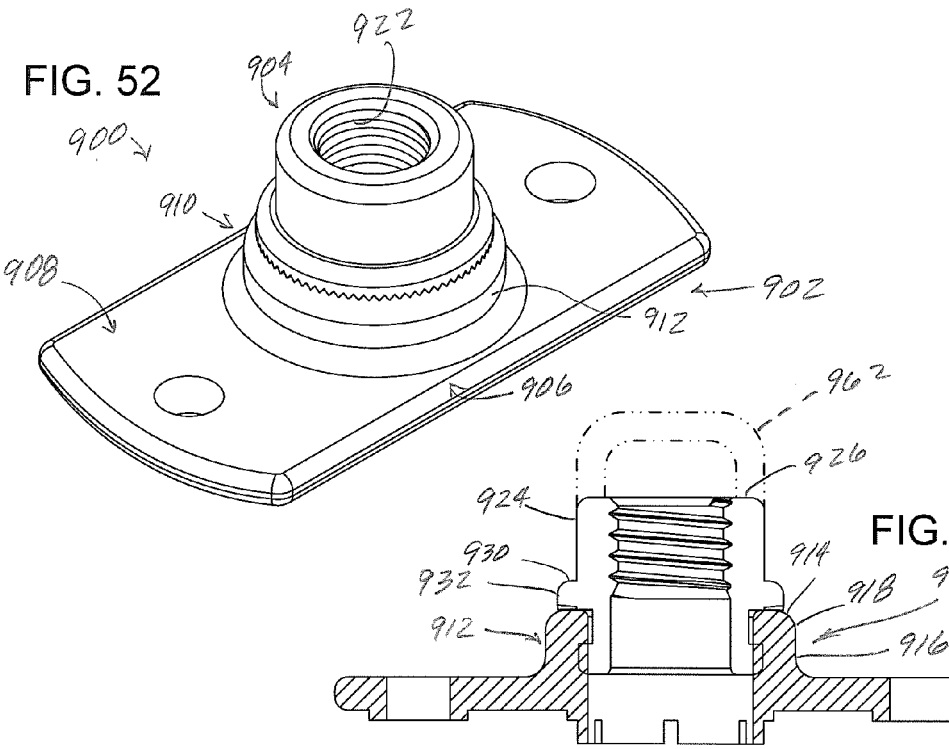
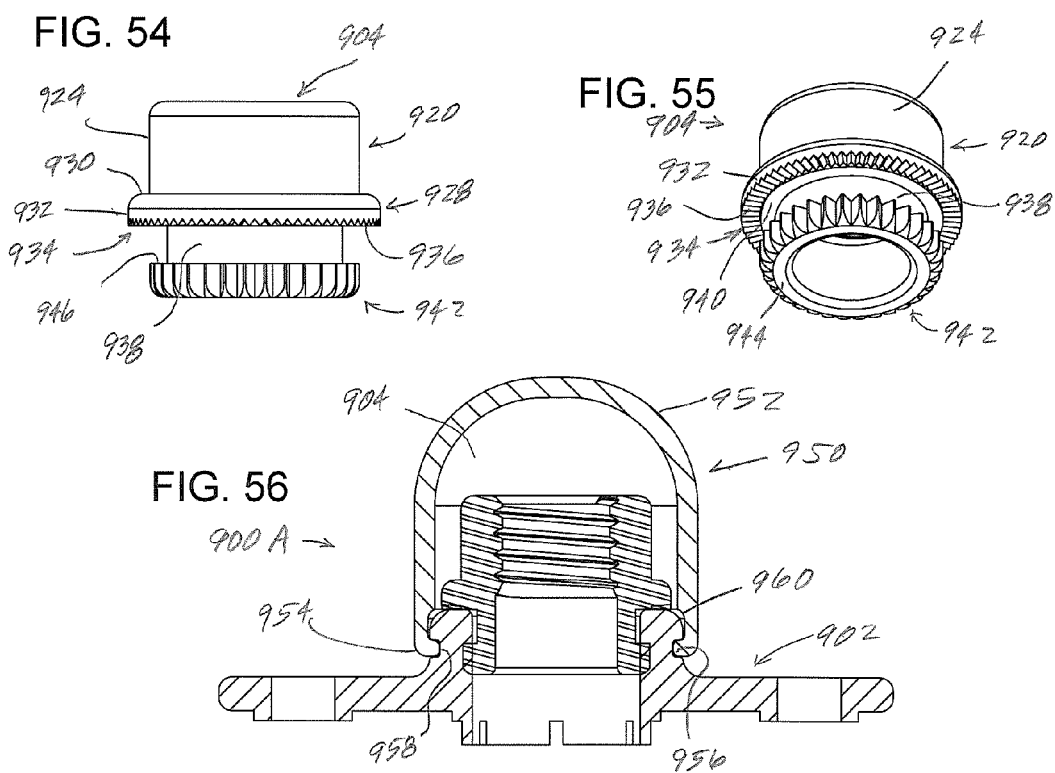

APPARATUS AND METHODS FOR SECURING A FASTENER

BACKGROUND

1. Field

These inventions relate to fastener receivers, for example nut plates.

2. Related Art

Nut plates include a base or bottom plate supporting a nut or similar fastener element. The nut plate helps to hold components, for example panels, together when a fastener is engaged with the nut and tightened down. The nut receives a bolt, screw or other threaded element passed through the hole and threaded into the nut. Nut plates may be used in automobiles, appliances and aircraft, as well as in other applications.

In aircraft applications, the types and numbers of fasteners add significant weight to the final assembly. Panel fasteners, for example, may have a number of parts, most or all of which are metal. Metal is used for strength, corrosion resistance and other factors. However, the metal parts add appreciable weight to the final assembly. If the weight of a given part could be reduced, because of the number of individual parts, even small weight reductions in an individual component may add up to a significant weight reduction overall. Additionally, some metal materials may still experience some corrosion and may also be incompatible with surrounding materials.

SUMMARY

Nut plates are described that are easy to assemble, lightweight and more corrosion resistant than many conventional nut plates. Additionally, the fastener may be configured to be more compatible with composite structures. The described nut plates may also be easy to manufacture.

In one example of a fastener receiver or support for a fastener element, the support includes a base for being supported on a support surface. The base includes a structure for supporting a fastener element wherein the structure is at least partly non-symmetrical about a plane other than a horizontal plane parallel to the base. For example, the structure is non-symmetrical about a vertical transverse plane. In another example, the structure is symmetrical about one vertical plane and non-symmetrical about another vertical plane, for example symmetrical about a longitudinal vertical plane and non-symmetrical about a transverse vertical plane where the two vertical planes are perpendicular to each other. In one configuration, the fastener element may be movable in several directions in a plane substantially parallel to the base, and the structure has barriers limiting movement of the fastener element in one direction different than barriers limiting movement of the fastener element in an opposite direction. In another configuration, the fastener element can be inserted and removed from only one side of the support.

In another example of a fastener receiver or support for a fastener element, the support includes a base for being supported on a support surface. The base can be substantially planar. One side of the base contacts the support surface, and the other side of the base supports the fastener element. In one example, the fastener element is inserted into and removed from the base from only one side of the base, for example in a direction parallel to the base. In another example, the fastener element is limited in its ability to pivot relative to the support by opposite side walls, and in another example the fastener element is limited in its ability to pivot relative to the support by opposite side walls and an end wall, for example an end wall between the opposite side walls. The opposite side walls can be substantially mirror images of each other, and may be substantially parallel to each other. The end wall can have one or more openings, for example to receive complementary projections on the fastener element. The support can have an opening opposite the end wall for receiving the fastener element.

In a further example, a fastener receiver or support for a fastener element can include a support element for the fastener element and a structure on the support element for receiving the fastener element. The structure includes an opening configured to allow insertion and removal of the fastener element through the opening in a direction at least partly parallel to the support element. In one configuration, the opening allows insertion and removal in only one direction, for example from a front of the structure. A portion of the structure opposite the opening has at least one barrier, boss, post or bearing surface for limiting movement of the fastener element away from the opening. The at least one limiting element, for example barrier or bearing surface, can also limit pivoting of the fastener element relative to the structure. In another configuration, the fastener element can include a cylindrical element or barrel and the structure on the support element for receiving the fastener element may include a wall extending around part of the cylindrical element. The wall may be closed at a position on a portion of the support element opposite the opening, so that the wall can be used to limit movement of the fastener element away from the opening. The cylindrical element may have a diameter and the wall extending around part of the cylindrical element may have an opening defining a width slightly less than the diameter so that a non-trivial force is used to pass the cylindrical element through the opening.

In any of the foregoing examples, the fastener receiver can have a flat surface on the base for contacting the support surface, means for securing the fastener receiver to the support surface (for example, but not limited to rivets, bolts, or other fasteners, adhesive, adhesive tape, double-sided adhesive tape, sonic welding, bonding agents or other means for fixing the fastener receiver to the support surface), a textured or non-smooth surface facing the support surface, or other mounting structures or compounds. They can also be configured to allow the fastener element, such as a nut, to float and/or pivot a desired amount relative to the support. Floating can be used to allow self-adjustment, and pivoting can be used to position the fastener element relative to the support so as to bear against multiple bearing surfaces to absorb loading applied to the fastener element. They can also be configured to allow releasable retention of the fastener element, for example through a restricted opening in the side of the structure whereby insertion and removal of the fastener element is accomplished through application of a non-trivial force in a given direction. Additionally, they can be configured so that the fastener element occupies a given surface area and a bearing structure occupies a surface area of comparable magnitude along at least one side of the fastener element, which may also be along opposite sides of the fastener element, or about three or more sides of the fastener element. They may also be configured to accommodate a fastener element having a relatively planar support structure and an at least partially cylindrical fastening structure for receiving a complementary fastener element wherein the cylindrical structure is partially surrounded by a wall in the fastener receiver.

In another example, a fastener receiver is provided having a non-metal support and fastener cage integral with each other. The support is supported on one surface and the fastener cage is opposite the surface. The support extends in substantially two dimensions, and in one example is substantially planar. In another example, the support includes an opening for receiving a shank or shaft of a fastener element to be engaged with a corresponding fastener element in the fastener cage, and no portion of the support extends around and reverses itself on the support to be spaced apart from the opening. In this example, the support can be curved rather than precisely planar, while still not curving or turning back on itself. In one example, the non-metal support and fastener cage are molded plastic, and can be formed from a material such as TORLON. In another example, the support can include one or more securing portions, and in the case of plural securing portions, a second securing portion can be on a side of the fastener cage opposite the first securing portion. In another example, a second securing portion can be positioned other than on an opposite side of the fastener cage from the first securing portion. For example, first and second securing portions can be at right angles to each other, on the same side of the fastener cage, or otherwise.

In a further example, a fastener receiver has a non-metal support and fastener cage integral with each other wherein the fastener cage includes an opening in a side of the fastener cage. The opening can be used to insert a fastener into and remove a fastener from the fastener cage. In one example, the side opening is the only way for inserting and removing the fastener element. In another example, the fastener cage includes an opening in a front of the fastener cage. The front opening can be used to insert a fastener into and remove a fastener from the fastener cage. In this example, the front opening may be the only way for inserting and removing the fastener element.

In an additional example of a fastener receiver having a non-metal support and fastener cage integral with each other, the fastener cage can have multiple surfaces against which corresponding surfaces on a fastener element can bear when the fastener element pivots. In the example, the fastener cage includes at least two surfaces against which corresponding surfaces on the fastener element bear at the same time when the fastener element pivots. The at least two surfaces can be side surfaces in the fastener cage, such as oppositely facing side surfaces. The fastener cage can also include one or more additional surfaces against which corresponding surfaces on the fastener element can bear, preferably simultaneously, when the fastener element pivots. For example, additional surfaces can be provided by a post, column or other bearing surface, such as may be located between oppositely facing side surfaces in the fastener cage and extend upward from a fastener support surface. Where the fastener includes a base, such as one having an "H" configuration, the base can include tips configured so that at least three tips surfaces engage bearing surfaces in the fastener cage when the fastener element pivots.

In another example of a fastener receiver, the fastener receiver includes a support and a fastener cage on the support for receiving a fastener element. The fastener cage includes an upper portion for receiving a portion of a fastener element body. The cage upper portion extends substantially parallel to the support and includes an opening through the upper portion where the wall defining the opening extends through an angle less than 360 degrees. In one example, the wall extends in a substantially partial circle, and in another example, the wall extends about 255 degrees. In one example, the opening includes an entrance spacing having a width sufficiently less than an outside dimension of the fastener element body so that some force is used to insert and withdraw the fastener element from the cage. In one configuration, the entrance is positioned on a longitudinally-extending side of the fastener receiver. In another configuration, the fastener cage can include side walls extending from the support to the cage upper portion for providing bearing surfaces against which a fastener element can bear when the fastener element pivots. Additionally, a post or column can extend between the support and the cage upper portion for providing additional bearing surfaces.

In a further example of a non-metal fastener receiver, a fastener having a base is positioned in the fastener receiver above a support panel. The fastener base and the support panel have approximately the same height. Additionally, the fastener cage has a height above the support approximately twice the base height. For example, the cage can include an upper support panel for supporting the fastener from above, and the material thickness of the support panel can be approximately the same as the base height. Furthermore, side walls extending between the support and the upper support panel can extend a height slightly greater than a height of the fastener base. In this configuration, the support represents approximately a third of the height of the fastener receiver, the side walls represent approximately a third of the height of the fastener receiver, and the upper support wall thickness represents approximately a third of the height of the fastener receiver. In one configuration, the fastener receiver is molded to have the described configuration.

In an additional example of a fastener receiver formed from a support, the support includes a fastener cavity with a fastener substantially permanently retained in the fastener cavity. In one example, the fastener cannot be removed without substantially destroying at least a portion of the cavity. In another example, the fastener is molded in place in the support. The fastener can include serrations in one or more surfaces to engage complementary surfaces in the support. In other examples, the fastener can include multiple surfaces, such as multiple non-arcuate surfaces, for helping to hold the fastener in place, for example against pivoting.

In any of the foregoing examples, the fastener receiver or support for a fastener element can include a support element for the fastener element and a structure on the support element for receiving the fastener element. At least two and sometimes at least three bearing or pivot-preventing surfaces are provided and are contacted when a fastener element is supported by the support element and pivots in one direction, and in another example when the fastener element pivots in two different directions, such as in opposite directions. The bearing surfaces can be walls, posts, columns, bosses, and relatively fixed structures.

These and other examples are set forth more fully below in conjunction with drawings, a brief description of which follows.

BRIEF DESCRIPTION OF THE DRAWINGS

FIG. 15 is an upper isometric view of a fastener and fastener receptacle combination wherein the fastener receptacle includes a circular support.

FIG. 16 is a front elevation view of the combination of FIG. 15.

FIG. 17 is a right side elevation view of the combination of FIG. 15.

FIG. 18 is a lower isometric view of the combination of FIG. 15.

FIG. 19 is a horizontal section view of the combination of FIG. 15 taken along line 19-19 of FIG. 17.

FIG. 20 is a vertical longitudinal section view of the combination of FIG. 15 taken along line 20-20.

FIG. 21 is an upper isometric view of the fastener element shown in FIGS. 15-20.

FIG. 22 is an upper isometric view of a fastener and fastener receptacle combination having mounting elements on a single side of a fastener cage.

FIG. 23 is a left side elevation view of the combination of FIG. 22.

FIG. 24 is a front elevation view of the combination of FIG. 22.

FIG. 25 is a vertical sectional view of the combination of FIG. 22 taken along line 25-25 in FIG. 24.

FIG. 26 is a horizontal section view of the combination of FIG. 22 taken along line 26-26 of FIG. 24.

FIG. 27 is a side elevation view of an eyelet for use as part of a mounting portion in the example shown in FIGS. 22-26, as well as any of the other mounting portions described herein.

FIG. 28 is a horizontal section view similar to that of FIG. 26 of an alternative combination of a fastener and fastener receptacle combination.

FIG. 29 is a left rear upper isometric view of another example of a fastener receptacle.

FIG. 30 is a top plan view of the receptacle of FIG. 29.

FIG. 31 is a lower left rear isometric view of the fastener receptacle of FIG. 29.

FIG. 32 is an upper rear isometric view of another example of a fastener receptacle having a curved support surface.

FIG. 33 is a rear elevation view of the fastener receptacle of FIG. 32.

FIG. 34 is a lower rear isometric view of a fastener receptacle having a curved support surface.

FIG. 35 is an upper front right isometric view of the fastener receptacle of FIG. 34.

FIG. 36 is a longitudinal vertical section view of the receptacle of FIG. 34.

FIG. 52 is an upper left front isometric view of an embedded fastener and receptacle combination.

FIG. 53 is a vertical longitudinal cross-section of the combination of FIG. 52.

FIG. 54 is a side elevation view of a fastener used in the combination of FIGS. 52-53.

FIG. 55 is a lower isometric view of the fastener used in the combination of FIGS. 52-53.

FIG. 56 is a vertical longitudinal cross sectional view of the combination of FIG. 52 with a covering cap over the nut element.

DETAILED DESCRIPTION

Figure 1:
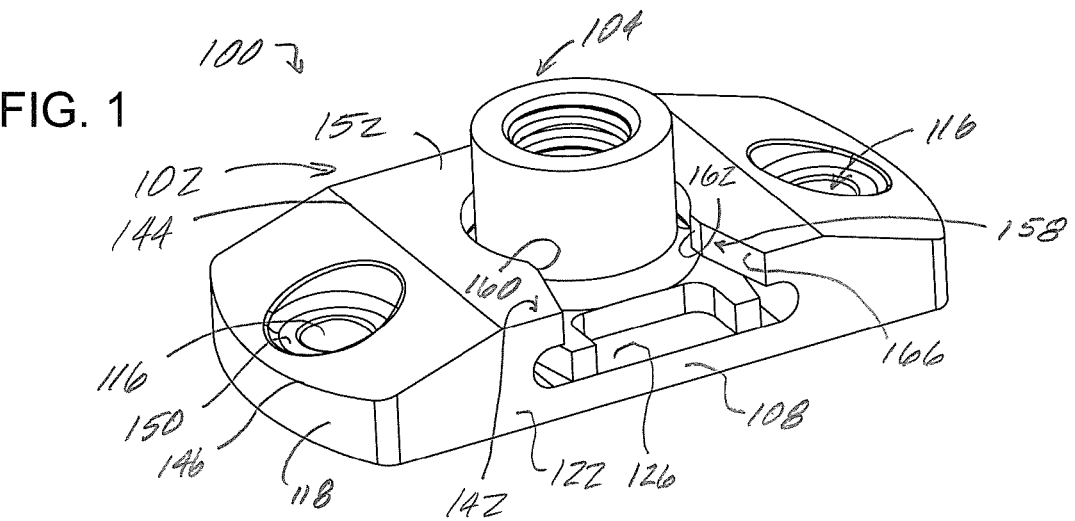
FIG. 1 is an upper left front isometric view of a fastener receptacle and fastener element in the form of a nut plate assembly.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of fastener assemblies and of methods of making and using the fastener assemblies are described. Depending on what feature or features are incorporated in a given structure or a given method, benefits can be achieved in the structure or the method. For example, fastener assemblies with a nut element held in a nut receptacle or support having substantial bearing surfaces may be easier to use and maintain. Fastener assemblies with nut elements having simple attachment elements may be easy to install and maintain. Additionally, some fastener assembly configurations may also benefit from lighter-weight components, lower manufacturing cost and improved material compatibility and corrosion resistance.

Improvements are also provided to components with which the fastener assemblies may be used. For example, panels using the fastener assembly may be simplified or may be assembled more efficiently.

These and other benefits will become more apparent with consideration of the description of the examples herein. However, it should be understood that not all of the benefits or features discussed with respect to a particular example must be incorporated into a fastener assembly, component or method in order to achieve one or more benefits contemplated by these examples. Additionally, it should be understood that features of the examples can be incorporated into a fastener assembly, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of fastener assembly configurations and of methods of making and using the fastener assemblies are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

It should be understood that terminology used for orientation, such as front, rear, side, left and right, upper and lower, and the like, are used herein merely for ease of understanding and reference, and are not used as exclusive terms for the structures being described and illustrated.

Figure 13:
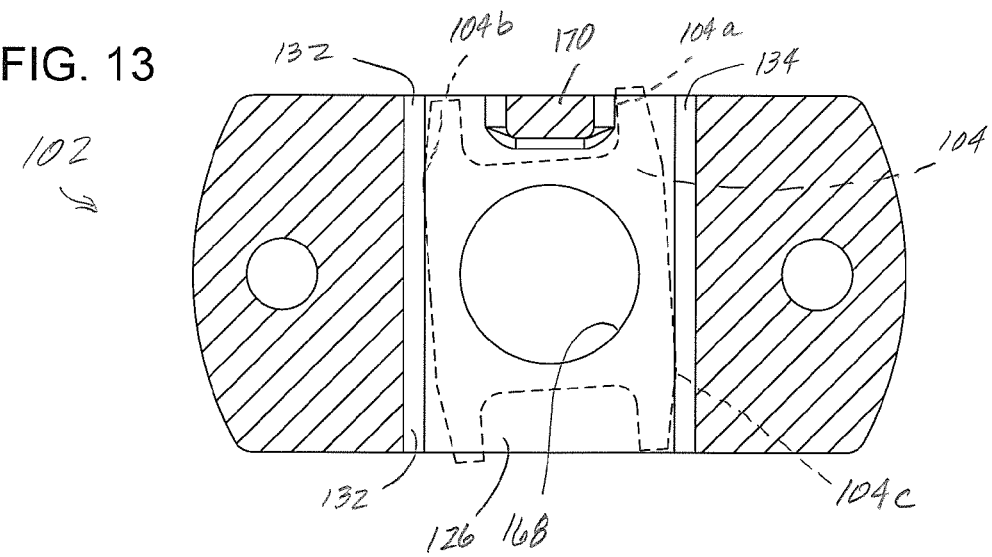
FIG. 13 is a horizontal cross-section of the fastener receptacle of FIG. 1 taken along line 13-13 of FIG. 7.
Figure 14:
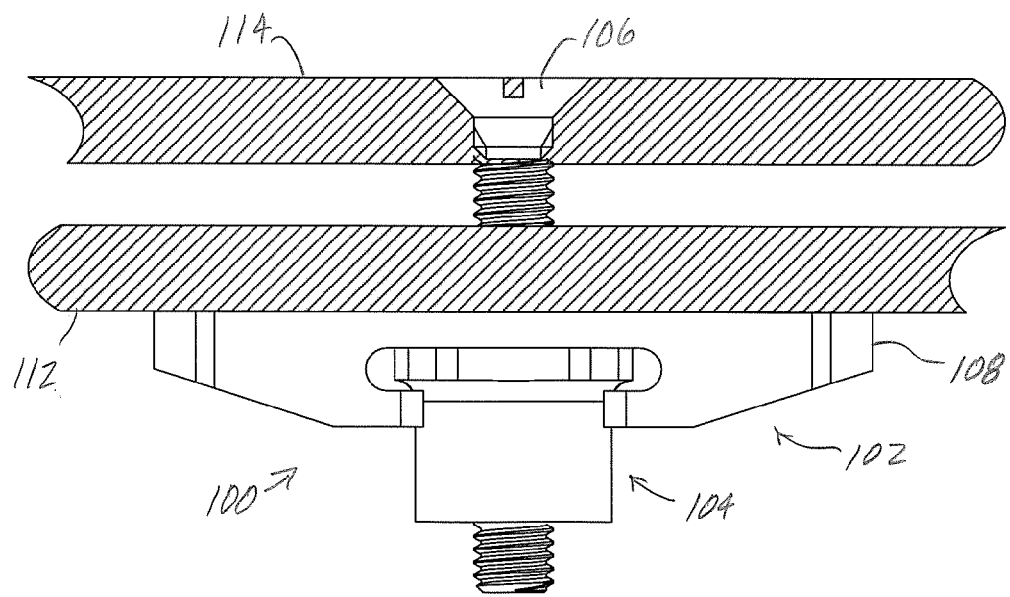
FIG. 14 is a side elevation and partial section view of a fastener assembly in a configuration to secure structures together, for example a structure and a panel.
Figure 37:
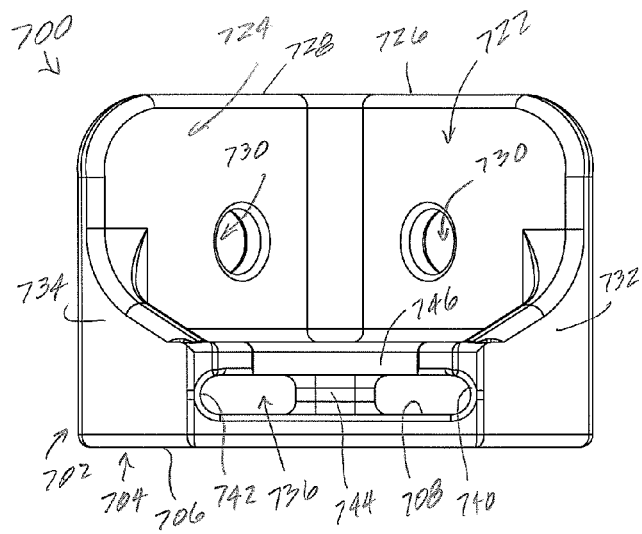
FIG. 37 is a front elevation view of another example of a fastener receptacle.

In one example of a fastener assembly (FIGS. 1-14), a fastener assembly in the form of a nut plate 100 (FIGS. 1-3 and 14) includes a fastener receiver in the form of a receptacle 102 (FIGS. 1-14). The fastener receptacle supports a fastener element, in the present example a nut element 104 (FIGS. 1-3 and 14). The nut element 104 receives a complementary fastener such as bolt 106 (FIG. 14). The fastener assembly may or may not include the bolt 106, depending on whether or not the assembly is combined and sold with or without the bolt 106, for example.

The plate 102 includes a base 108 having an outward facing surface 110 (FIG. 10) for being supported on a support surface 112 (FIG. 14). The support surface 112 may be a frame structure, bulk head or other structural support. The bolt 106 extends through a panel or other component 114 and threads into the nut element 104 for securing the component 114 to the structure 112. In other configurations, the nut element 104 and bolt 106 may be otherwise configured to be secured together through means other than threads, such as detents, pins and grooves, latches, locking elements or the like.

The outward facing surface 110 may be formed on a mounting plate, planar member, tab or tab combination, a plurality of wings, or other surfaces for helping to support the nut plate on the support surface 112. In the present examples, the outward facing surface 110 is formed on the base 108, which is a substantially planar plate member, and the outward facing surface 110 is substantially flat. The base 108 includes structures for mounting the base to the support surface 112. In one example, the base 108 includes openings 116 (FIGS. 1, 6 and 10) for receiving fasteners, for example rivets, threaded fasteners, and the like. The openings can be reinforced with respective eyelets (not shown), which may have cylindrical walls extending into the openings 116 and a perpendicular rim extending outward from the cylindrical wall. In addition, or alternatively, the openings can help to hold adhesives, films, double-stick tape or other pressure sensitive adhesives, or other bonding elements for holding the nut plate on the support surface. In the examples of bonding agents or adhesives that might be flowable, such material may extend into the openings, may extend over the upper edges of the openings, and may also extend over part or all of the upper surfaces of the base. Contact of the material with the adjacent surface(s) of the base help to hold the nut plate in place. Engagement between the material and the adjacent edges of the nut plate help to hold the nut plate in place. Eyelets may be used in or around the openings to help resist loading forces that may be experienced through the nut plate when held in place through the mounting fasteners. Where adhesives, films, double-stick tape or other pressure sensitive adhesives, or other bonding elements are used, openings can also be omitted, with the bonding element holding the nut plate to the support surface through an appropriate bonding surface on the nut plate.

The outward-facing surface 110 can incorporate a smooth or non-smooth surface adjacent to the intended support surface. A non-smooth surface can be textured, roughened, knurled, abraded, peened, inclusive of one or more projections or depressions, or otherwise varied. This non-smooth surface condition may improve the strength characteristics when joined to the support surface. The improved strength characteristics relate to the effectiveness of the attachment method of the nut plate with the intended support surface, which can include but is not limited to, peel, push-out, torque-out, and incidental jarring or hitting (with another object) of the attached nut plate.

Figure 3:
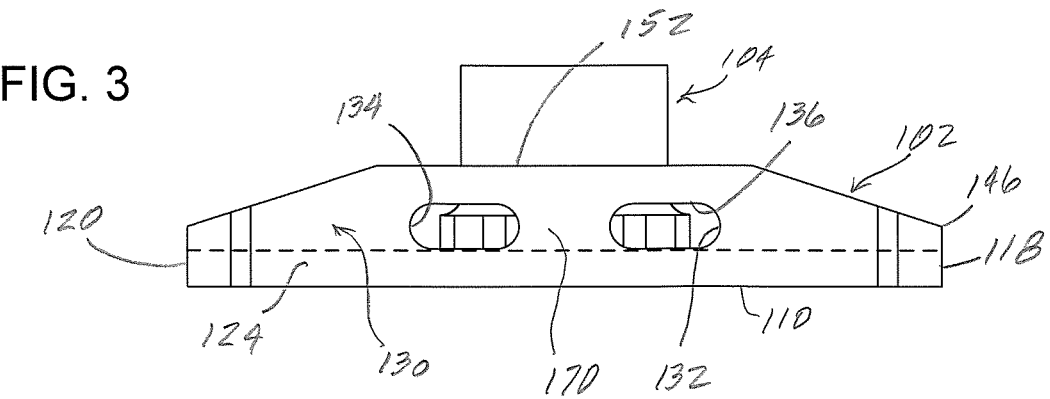
FIG. 3 is a front elevation view of the fastener receptacle and fastener element of FIG. 1.
Figure 5:
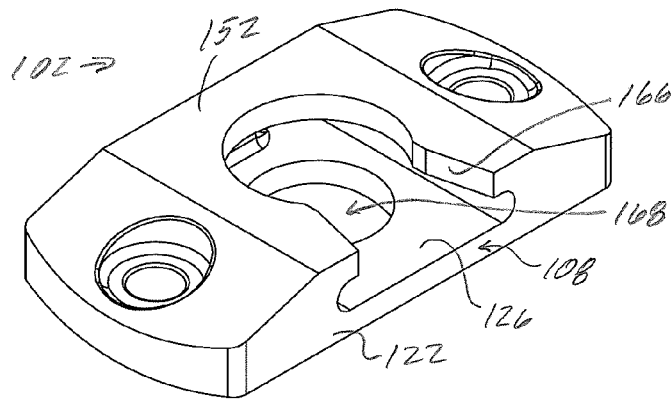
FIG. 5 is an upper left front isometric view of the fastener receptacle of FIG. 1.
Figure 6:
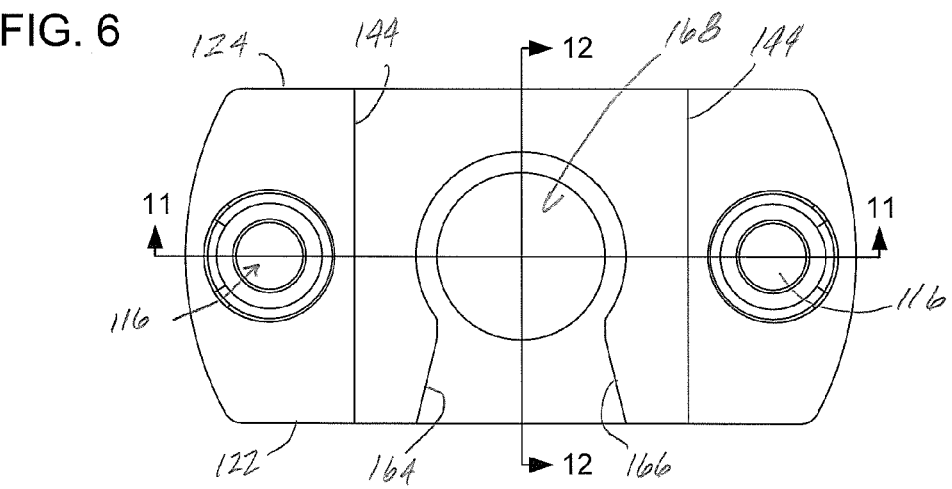
FIG. 6 is a top plan view of the fastener receptacle of FIG. 1.
Figure 7:
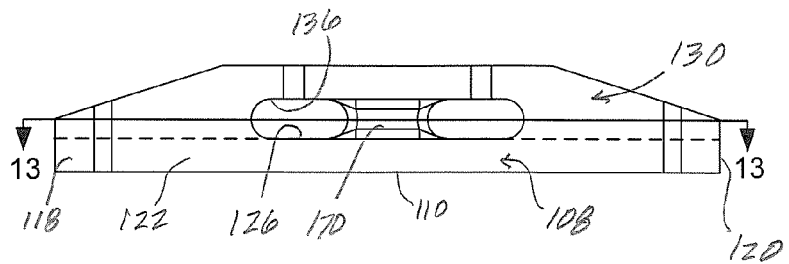
FIG. 7 is a front elevation view of the fastener receptacle of FIG. 1.
Figure 8:
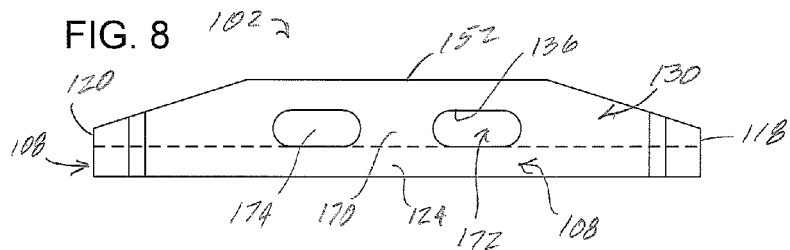
FIG. 8 is a back elevation view of the fastener receptacle of FIG. 1.
Figure 9:
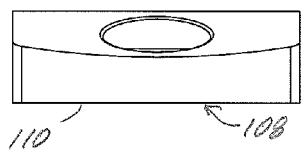
FIG. 9 is a side elevation view of the fastener receptacle of FIG. 1.
Figure 12:
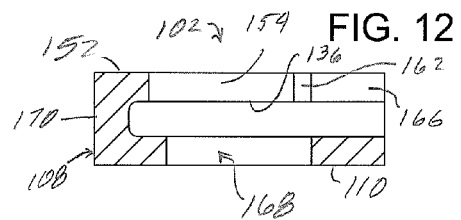
FIG. 12 is a longitudinal vertical cross-section of the fastener receptacle of FIG. 1 taken along line 12-12 of FIG. 6.
Figure 10:
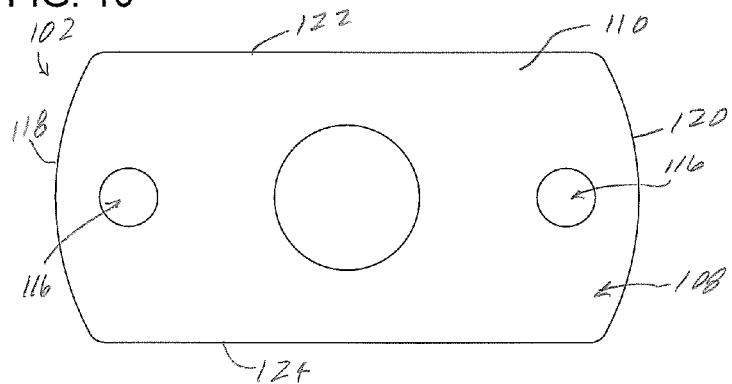
FIG. 10 is a bottom plan view of the fastener receptacle of FIG. 1.
Figure 11:
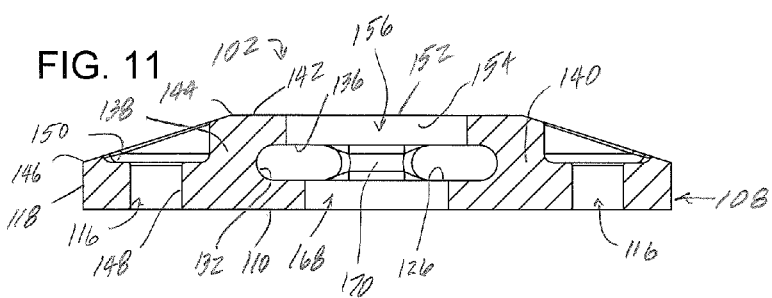
FIG. 11 is a transverse vertical cross-section of the fastener receptacle of FIG. 1 taken along line 11-11 of FIG. 6.

In the present example, the base 108 is a substantially planar structure extending from a left side 118 to a right side 120. The base extends from a front surface 122 to a rear surface 124 (FIGS. 3 and 6). In plan view (FIG. 10), the front and rear surfaces 122 and 124, respectively, are substantially straight and parallel to each other, and the left and right sides are slightly curved or have a radius. The base may have other profiles, however. The sides and front and rear surfaces extend substantially perpendicular to the outward facing surface 110. The base extends upward to an upper base surface 126 (FIGS. 1, 5 and 11). The upper base surface 126 supports the nut element 104. The upper base surface 126 is substantially flat and supports a substantially flat lower surface of the nut element 104. The upper base surface 126 allows the nut element 104 to pivot and/or float. The base forms a substantially planar support for the nut element, and one side of the base contacts the support structure to which it is mounted and the other side of the base supports the nut element. The base is substantially solid in this example, except for the fastener opening described herein. In some configurations, nut element rotation may made more difficult or otherwise limited, such as by making the upper base surface textured, knurled, roughened or otherwise non-smooth. For example, pivoting can be reduced by such surface configurations in combination with non-smooth surfaces on the bottom of the nut element 104. If the bottom of the nut element 104 remains smooth, the nut element pivots easier than if it was also non-smooth.

The base 108 also supports a support structure 130 (FIGS. 1, 3, 7, 8 and 11). The support structure 130 also supports the nut element 104. The support structure 130 provides bearing support surfaces that accommodate torque loading applied when the nut is under torque. The support structure 130 also allows the nut element 104 to float a desired amount along an axis substantially perpendicular to the base 108. The support structure 130 forms a partial enclosure for the nut element 104 and includes side walls, left side wall surface 132 and right side wall surface 134, and upper wall surface 136. The side wall surfaces and the upper wall surface allow the nut element to pivot and to float. The left and right side wall surfaces are formed in the present examples as each having a full radius from the upper base surface 126 to the upper wall surface 136. They can also be formed each with two half radius portions connected by a substantially straight side wall or otherwise. The left and right side wall surfaces extend substantially straight between and perpendicular to the front and rear surfaces 122 and 124, respectively. The side wall surfaces and the upper wall surface along with the upper base surface 126 form a partial enclosure for the nut element and retain the nut element within the partial enclosure while limiting movement of the nut element both parallel to a plane defined by the upper base surface 126 and axially thereto.

The left and right side wall surfaces are supported by left and right side walls 138 and 140, respectively (FIG. 11). The left and right side walls are substantially identical mirror images of each other, and only one will be described. Specifically, the left side wall 138 extends upwardly from the base 108 to an upper surface 142 and outward from the left side wall surface 132 to the left side 118. Additionally, the left side wall 138 extends from the front surface 122 of the base 108 to the back surface 124, and has respective front and back walls substantially co-incident with the walls of the base 108. The upper surface 142 can extend outward substantially parallel to the lower surface 110 of the base 108 to the left side 118, but in the present example, the upper surface 142 slopes downward from a line 144 outboard of the left side wall surface 132 to a curved line 146. In the present example, the lowest point of line 146 is approximately at a midpoint in the left side wall surface 132 between the upper base wall 126 and the upper surface 136. In this configuration, the left side wall supporting the left side wall surface 132 extends substantially from the left side wall surface 132 to the left side 118 for supporting torque loading that may be applied by the nut element 104. In the configuration where the openings 116 are included in the nut plate, the left side wall extends around the respective opening.

The opening 116 is a bore having a substantially cylindrical side wall 148 extending from the outward facing surface 110 upward to a counter bore 150 (FIG. 11), though it should be understood that the counter bore 150 can instead be a countersink, a chamfered surface, a radiused transition, a raised boss or rim or other structure, or it can be omitted entirely. The cylindrical side wall 148 and counter bore 150 join at approximately the level of the curve 146. Both the bore and the counter bore 150 are preferably substantially circular. The bore and counter bore receive appropriate fasteners or other attachment means for substantially fixing the nut plate to the support surface. The openings in the present example are arranged on opposite sides of the nut 104. However, they can be positioned on the same side or at an angle relative to each other about the nut 104. Where the openings 116 are omitted, the side walls extend from the side wall surfaces to the respective outer sides.

The left and right side walls extend toward each other over the upper base surface 126 and join at a bridge portion 152 (FIGS. 1, 3, 5, 8 and 11). The left and right side walls and the bridge portion together are configured to define a partially circular wall 154 defining an opening 156 for aligning a barrel of the nut element, described more fully below. The opening 156 has a reduced-width entrance 158 to allow the barrel of the nut element to be press fit through the entrance and into the opening 156. Because of the minimum spacing defining the entrance being somewhat smaller than the outside diameter of the barrel, the barrel will not come out of the opening without a similar guiding force. The minimum spacing is defined by respective opposite walls 160 and 162 (FIGS. 1 and 12), which may be flat, pointed, rounded or other configurations for providing an entrance while helping to keep the nut in the opening 156. The lead in to the entrance 158 is defined by a pair of diverging walls 164 and 166 extending outwardly from the respective sides of the entrance to the front sides of the side walls. The diverging surfaces help guide the nut into the opening 156.

The opening 156 is larger than but co-axial with an opening 168 in the base 108. The opening 168 is formed by a completely circular wall through the base. The opening 168 receives the fastener 106 for threading into the nut element 104.

The partial enclosure for the nut element may include a boss, post, column or rib 170. The column 170 extends upward from the upper base surface 126, and in the present example extends upward to the surface 136 and supports the bridge portion 152. The column 170 is substantially centered between the left and right side wall surfaces 132 and 134, respectively, and includes similarly radiused surfaces. The upper base surface 126, the column 170, the upper surface 136 and the left and right side wall surfaces define between them left and right openings 172 and 174 (FIG. 8) for receiving respective projections, points or tabs on the nut element 104. The width of the openings 172 and 174 are selected according to the desired pivoting movement to be allowed for the nut element. The height of the openings are selected according to the desired float for the nut element. In the present configuration, the configurations of the side surfaces of the column 170 and the inside wall surfaces 132 and 134 define the cross-sectional configurations of the openings, but the opening configurations can be different than the configurations of the side wall surfaces.

In the configuration shown in the drawings, the nut plate has at least the portion between the lines 144 symmetric about a longitudinal vertical plane such as that defined by the line 12-12 in FIG. 6. This configuration shown in FIGS. 1-13 also has the entire nut plate symmetric about that plane. The nut plate is asymmetric about a vertical transverse plane defined by a line 11-11 in FIG. 6, because the present example does not have a front column corresponding to the column 170, and the entrance 158 omits a bridge portion corresponding to the bridge portion 152. Therefore, the nut plate is asymmetric relative to a vertical transverse plane defined by the line 11-11. The nut plate is also asymmetric relative to a horizontal plane, such as that defined by line 13-13 in FIG. 7. The edge portions of the nut plate surfaces may all be radiused, if desired.

Figure 2:
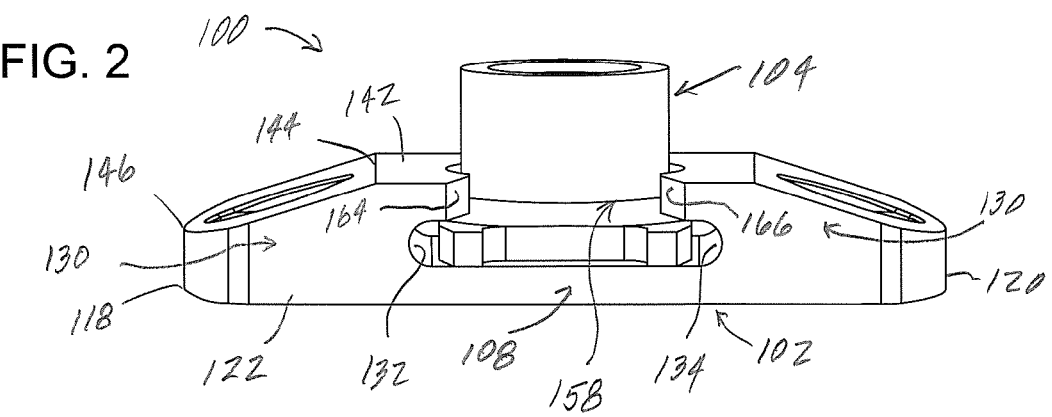
FIG. 2 is a front and slightly upper isometric view of the fastener receptacle and fastener element of FIG. 1.

When the nut element 104 is in place as shown in FIG. 1-3, the side wall surfaces 132 and 134 and the column 170 provide limiting elements, bearing elements, bearing surfaces or barriers limiting movement of the fastener element. They limit pivoting movement of the nut element. When the nut element pivots, the bearing surfaces provide at least three points of contact or three areas of contact (104*a*, 104*b* and 104*c* in FIG. 13) for receiving the torque loading applied by the nut element when the fastener is tightened down. Depending on the angular direction in which the nut element pivots (counterclockwise as viewed in FIG. 13), the loading is supported by one side or the other of the column 170 and by the side walls 138 and 140 (FIGS. 11 and 13).

The nut element 104 (FIGS. 1-4) includes a base 176 supporting a generally cylindrical internally threaded portion in the barrel 178. The barrel extends from the base 176 to an end surface 180 defining an opening for the barrel. The barrel may be substantially cylindrical in its inside and outside profile, or the barrel can be crimped to increase the frictional engagement with the fastener (for example 106). In an alternative configuration, the nut can also be a beam locking nut, or other nut configurations.

In the present example, the base 176 of the nut has a substantially smooth, flat bottom surface and a substantially smooth, flat upper surface. The upper surface curves from the flat surface upward to the outer perimeter surface of the barrel 178. The nut element 104 includes tips 180 extending outward from the base 176. The tips 180 can take the form of projections, pads, arms, extensions, points, cam surfaces, eccentricities or other surfaces which keep the base from having a circular perimeter. The tips 180 are arranged in pairs on each side of a transverse plane and each pair extends along a longitudinal plane. The tips 182 and 184 in the first pair extend in a direction opposite to the tips 186 and 188 in the other pair. The tip 182, and each tip in the example of the nut 104, includes a substantially straight wall 190 forming an inside surface of the tip 182, and an angled surface 192 forming an outside surface of the tip 182. The straight and angled surfaces end at a transverse flat end wall 194. Depending on the configuration of the nut support, pivoting of the nut 104 may cause the straight surface 190 to contact a bearing surface, the angled surface 192 to contact a corresponding bearing surface, or the respective junctions between those walls and the end wall 194 to contact a bearing surface. Additionally, some configurations may have the flat end wall 194 contacting a bearing surface.

The nut 104 in the present example is a conventional nut such as that shown and described in U.S. Pat. No. 6,854,941, incorporated herein by reference. The nut in the patent is formed from metal and is symmetric about both the transverse and longitudinal planes. Consequently, the nut can be inserted into the receptacle in two orientations, one 180 degrees apart from the other. The nut 104 can have the same configuration if desired.

The nut is inserted into the nut receiving area by directing one pair of the tabs of the nut between the surfaces 164 and 166. The barrel 178 is pressed through the opening 158. The tabs 186 and 188 are guided into the openings 172 and 174, respectively. As the nut element moves into position with the tabs 186 and 188 in the openings 172 and 174, the nut settles onto the upper base surface 126. The nut element can be removed by pressing the barrel 178 of the nut element out of the opening 158.

In the present examples, the nut support is formed from a non-metal material. In the present examples, one material is TORLON, and other poly-amide imides as well as other structural plastics or polymers can be used, including but not limited to among others; Vespel or Aurum (PI), Ultem (PEI), Victrex or Ketaspire (PEEK), Primospire (SRP), Polycarbonate, or Epoxide or Phenolic synthetic resins. The material can also be a composite material and may include fiber reinforcement or other strengthening materials. In these examples, only the nut and the fasteners securing the nut plate, if fasteners are used to secure the nut plate, are formed from a metal. Nut plates formed from non-metal materials with these or similar characteristics provide relatively high strength, and long lasting components that have relatively high resistance to corrosion. Additionally, molding of nut plates using such materials also permits manufacture of a number of nut plate configurations that can incorporate easily one or more of the features described herein.

The nut element is formed from metal and is symmetric about both the transverse and longitudinal planes. Consequently, the nut can be inserted into the nut plate in two orientations, one 180 degrees apart from the other. Other nut element configurations can be used, with or without changes in the nut plate configuration. For example, the nut element could be made asymmetric as well as having other configurations.

As with any of the configurations of the nut plates described herein, the structures supporting and retaining the nut, for example a nut receptacle, can be configured with a number of bearing surfaces against which projections or contact surfaces on the nut can bear when the nut is under torque, for example bosses, cavities, openings, walls and the like. These bearing surfaces can also include flats or other non-circular portions. Additionally, the nut plates and the nut elements both can be configured, though they need not be, to be at least in part complimentary with each other. For example, the nut 104 includes tabs that fit into the openings 172 and 174 of the nut support, and side walls in the base. The tabs and the sidewalls of the nut base substantially simultaneously bear against and are supported against further pivoting by complimentary surfaces in the nut support. For example, if the nut element has tabs in the form of star points, the nut support may have a plurality of convergent surfaces or walls so that at least some of the nut element surfaces on the star points contact respective ones of the convergent surfaces substantially simultaneously when the nut element pivots. Where the nut element includes a plurality of rounded tabs, for example lobes, the nut support can include rounded bearing surfaces. If the nut element has squared off tabs with straight side walls, the complimentary bearing surfaces on the nut support can also have flat bearing surfaces. Other combinations can also be used.

While any of the nut plate combinations described herein can rotationally fix the nut in place during normal usage, it is preferred to allow some rotational movement of the nut relative to the receptacle. Additionally, it is also preferred that when the nut is under torque, any projections or tabs or other surfaces that are intended to engage bearing surfaces on the nut support when the nut is under torque preferably contact those bearing surfaces substantially simultaneously, or if not simultaneously, all of the surfaces intended to engage bearing surfaces on the receptacle achieve the intended engagement.

In one example of the nut plate 102, the height or thickness of the base 108 can occupy about one-third of the overall height of the nut plate. The distance or spacing between the upper base surface 126 and the upper surface 136 may occupy about another third of the overall height of the nut plate. The thickness of the bridge portion 152 between the upper surface 136 and the surface 142 may occupy about another third of the overall height of the nut plate. Additionally, the spacing between the walls 132 and 134 may be between one-third and one-half the overall width of the nut plate between the ends 118 and 120. The remainder of the width is split substantially equally between the side walls 138 and 140.

To assemble the combination, the nut assembly 100 of FIG. 1 is fastened to the support element 112 so that the opening 168 is substantially coaxial with an opening in the support element. The fastener 106 is pressed through the opening in the panel 114 and threaded into the nut 104. When the fastener 106 first encounters the threads of the nut, the nut element is biased away from the panel 114, until the threads of the fastener 106 engage and advance into the nut element 104.

Further threading of the fastener 106 pulls the nut against the upper surface 126 of the base 108. Further threading of the fastener 106 also pulls the panel 114 against the support element 112 and secures all the components together.

In another example of a fastener and receptacle combination in the form of a nut plate combination, a nut plate 200 is substantially identical to the nut plate 100 in FIGS. 1-14 except for having a circular bearing surface for the support and for the upper surface of the cage and side walls extending substantially horizontally to the left and right side walls. Additionally, the nut base is substantially square in its footprint and its cage is closed opposite the cavity opening. Specifically, the nut plate 200 includes a base 202 having a substantially rectangular form extending from a right side wall 204 to a left side wall 206. The base can be considered as terminating at an upper level substantially co-planar with a fastener support surface 208 (FIG. 15).

The base includes a front support element 210 and a rear support element 212 (FIG. 15). The front support element extends frontward away from a lower most portion of the base, and the rear support extends rearward from a lower most portion of the base. The front and rear support elements along with the remainder of the base provide a bottom support surface 214 (FIGS. 16-18) that is used to support the fastener receptacle on an underlying structure, to which the fastener receptacle is to be attached. In profile, the bottom support surface 214 is circular. The bottom support surface provides a larger surface area for supporting the nut plate on the underlying structure. The larger surface area can be useful for holding the nut plate on the structure more securely, such as through adhesive, or other bonding agents. In some applications, securement of the assembly on the underlying support structure is suitable with only an adhesive or bonding material. Larger surface areas for the bottom support surface contribute to the securement by bonding. In other applications, both bonding material and fasteners may be used, and in others bonding material is omitted. The thickness or height of the front and rear support elements may be selected as a function of the material strength of the base, the expected loading in the part as well as the diameter of the base.

The bottom support surface 214 in the present example includes a plurality of spacer areas to be included for example when adhesive is used to help hold the receptacle on the underlying structure. The spacer areas may be selected so as to be approximately the same height as the expected thickness of the adhesive. In the example shown in FIGS. 16-20, the bottom support surface 214 includes first, second, third and fourth bosses 216-222, respectively. The bosses in the present example are substantially circular and are positioned in board from but adjacent the left and right side edges 204 and 206. They are positioned under respective corner portions of the rectangular portion of the base. One pair is positioned on opposite sides of a fastener opening 224 and the other pair is positioned on opposite sides of a fastener opening 226. Additionally, each fastener opening is encircled by a respective spacer wall 228 and 230 (FIG. 18) for supporting the portion of the base around the respective openings, for example when a fastener is used to attach the nut plate to the underlying structure. Alternatively if desired, one or more or all of the spacer areas can be omitted. Additionally, any of the fastener receptacles described herein can include spacer areas, and any spacer areas can take a number of forms, including bosses, raised rings, spokes, lines, arcs, and the like.

The base 202 in the example shown in FIGS. 15-20 also includes a spacer wall 232 around an opening 234 formed in the bottom of the base for receiving a shank or other portion of a fastener. The spacer wall 232 serves substantially the same function as the spacer areas previously described, and can be omitted if desired.

The base 202 also includes a positioning element, which in the present example takes the form of a crenellated wall 236 (FIGS. 16-18) extending axially outward from the bottom support surface 214 and around the opening 234. The outer diameter of the wall 236 is preferably less than the outer diameter of the spacer wall 232 so that the spacer wall 232 can bear against the underlying structure. The wall 236 is formed sufficiently long extending away from the bottom support surface 214 so as to engage and possibly extend into the corresponding opening in the underlying support structure. The wall 236 helps to position the nut plate about the opening and to maintain its position. Any of the fastener receptacles can include a positioning element, including a wall such as the crenellated wall 236.

The nut plate 200 includes an upper surface 238 (FIGS. 15-17) that extends from the right side to the left side of the nut plate except for the opening for the nut. The upper surface 238 is substantially planar, but could be configured to slope downward as it approaches the right and left sides. The openings 224 and 226 extend substantially vertically between the upper surface 238 and the respective spacer walls 228 and 230.

The nut plate 200 receives and releasably supports a nut 240 (FIGS. 15-17 and 19-21) is a cavity 242. The cavity 242 is substantially identical to that described with respect to FIGS. 1-14, with the nut support wall, the side walls, and the upper support wall, except that the end 244 of the cavity at the rear is closed. The right and left side walls each have a radius and the height of the side walls is slightly greater than the height of the nut base. The rear of the cavity is closed by an end wall 246 extending between the base 202 and the upper wall 238. The end wall 246 may also include a radius.

The nut 240 includes a base 248 and a body 250. The nut may be substantially identical to the nut 104 and may be incorporated into the nut plate in the same manner, but in the present example the base 248 has a rectangular outline, specifically in this example a square outline. In the configuration, when in the cavity, pivoting of the nut plate within the cavity generally brings three corner surfaces of the nut into contact with adjacent walls of the cavity. The adjacent walls of the cavity serve as bearing surfaces to limit rotation or pivoting of the nut within the cavity. Therefore, the nut plate configuration shown in FIGS. 15-21 also provides three-point contact to limit rotation of the nut in the cavity. Additionally, the nut is configured to be square so that any side of the nut can be inserted first into the cavity to assemble the plate without any need to place the nut in a particular orientation. Alternatively, in a rectangular, non-square configuration, the nut 240 can be inserted into the cavity in either of two orientations, 180 degrees apart, of the base 248.

In a further example of a fastener and receptacle combination in the form of a nut plate combination, nut plate 300 (FIGS. 22-27) provides a side-load nut assembly and a single lug or mounting tab for the configuration. The nut plate will be considered as having a configuration for receiving and supporting a nut such as nut 104 (FIG. 5), but the nut plate can be configured for receiving and supporting other nut configurations.

The nut plate 300 includes a base 302 supporting a nut cage 304 for receiving and supporting a nut 104. The base 302 is configured to be mounted on an underlying support structure, such as that described with respect to FIG. 14. The internal structure of the nut cage 304 is substantially the same as that described with respect to FIGS. 1-13, and the height of the base 302, the height of the cage side walls and the height (or material thickness) of the upper support wall are substantially the same as those described with respect to FIGS. 1-13.

In the present example, the base 302 is substantially planar and extends from a right end 306 to a left end 308. The base includes a bottom support surface 310 placed against an underlying support structure and secured thereto. The upper surface 312 of the base supports the cage 304.

The base includes a single lug 314. Two openings 316 are formed through the lug 314 for receiving rivets or other fasteners for mounting the nut plate to the underlying structure. A single opening or more than two openings can be used, as desired, and the number, size and location may be selected as a function of the expected loading, the available space, and whether other securing means are used, such as adhesive or bonding agents. A single lug nut plate may be useful in limited space applications, along surface edges or corners or interior to the edges of a structure. In the present example, both openings are located on the same side of nut element, as opposed to on opposite sides or at an angle relative to the nut element, which are also possible. Each hole can include a respective eyelet 318 (FIGS. 22-24 and 26-27) for example when significant loading is expected or when fasteners are used formed from a material harder than the material of the lug of the nut plate.

One or more reinforcing walls 320 can be included for supporting the nut cage 304 relative to the base 302. In the present example, the reinforcing walls 320 extend from the right side of the nut cage 304 to the upper surface of the base 302, on respective sides of the openings 316. The reinforcing walls 320 slope downwardly from the upper surface of the cage to the upper surface of the base 302. The reinforcing walls have a substantially constant slope downward and terminate approximately at a mid portion of the right-most opening 316. As shown in FIG. 26, the reinforcing walls have approximately the same material thickness as that for the nut cage side walls. However, the thickness can be different if desired.

The access opening 322 (FIGS. 24 and 26) for the nut cage in the present example is positioned at a side of the nut plate, rather than at a front or rear of the plate. In the present example, the nut 104 is inserted in and removed from the cage through only the single access opening 322, and following a path that is substantially parallel to the upper surface of the base 302. However, locating the access opening 322 and suitable guiding of the nut 104 may be made easier by slightly tilting the nut 104 until tabs of the nut contact the upper surface of the base 302 followed by insertion parallel to the upper surface.

In the examples of the nut plates described herein, eyelets such as eyelet 318 (FIG. 27) can be used in conjunction with securement openings in the nut plate. The eyelets 318 shown in FIGS. 22-24 and 26-27 include a cylindrical portion 324 extending part or all of the way into the opening 316. A rim or flange 326 extends outwardly from an end portion of the cylindrical portion 324, for example for overlying or protecting a portion of the upper surface of the base 302. The rim 326 can also be recessed or set into the upper surface so that the top surface of the rim is flush with the upper surface of the base. Other eyelet configurations can also be used.

Other lug arrangements can be used with the side-loading nut cage. Additionally, other nut loading configurations can be used with the single lug securement configuration. For example, as shown in FIG. 28, an alternative nut plate 330 with a front-loading cage 332 configuration is included on a single lug base 334. The reinforcing walls 336 are thicker than the vertical walls 338 and 340 of the cage 332, but the nut plate 330 can be otherwise identical to the nut plate 300.

In another example of a fastener receptacle support, a receptacle for a nut plate combination is shown in FIGS. 29-31. The receptacle 400 is configured to accommodate the nut 104 described with respect to FIG. 4, but the receptacle can be configured to accommodate a nut having other configurations. The nut 104 is not shown with the receptacle 400, but it is understood that the nut 104 can be inserted into and removed from the nut cage and would be supported in the nut cage in a manner substantially the same is that described above with respect to the nut in FIG. 4.

The receptacle 400 includes a base 402 supporting a cage 404. The base includes a bottom support surface 406 that will be placed against and secured to an underlying support structure. The base includes a right lug 408 and a left lug 410, each extending away from respective sides of the cage 404. The receptacle 400 is considered to have a front-loading cage 404 so that the lug 408 is on the right side and the lug 410 is on the left side of the cage.

Each lug includes a respective opening 412 that can be used to assist in securing the receptacle to the underlying support structure. Each opening 412 can be considered as being centered approximately equidistant from the external sides of the respective lug, for example the distance defined by a radius 414 from a center of the opening to the outside of the rounded edge of the respective lug. In the lug configuration shown in FIGS. 29-31, each lug is directed forward toward the front of the receptacle so as to be directed at an angle (represented by the angle formed between the line 416 in FIG. 30 and the right side of the cage 404) from the adjacent side of the cage 404. As a result, each opening 412 is positioned closer to the front of the cage than to the rear of cage. Additionally, each lug includes a portion that extends forward of the front of cage, in the present example. The receptacle can be used to support a fastener element near a corner of a panel, for example. An opening 418 is formed through the base for receiving an appropriate portion of a fastener element, as is typical for nut plates.

The base 402 supports the nut cage 404. The nut cage includes a right side wall 420 and a left side wall 422 extending upward from the upper surface of the base 402 to an upper panel 424. The interior structural details of the nut cage are substantially identical to those described above with respect to the nut plates of FIGS. 1-14 and 22-28. For example, the interior of the nut cage 404 includes a substantially planar nut support surface 426, radiused internal side walls facing each other and extending upward to the upper panel 424 and a boss, post, column, or rib 428. The column 428 extends from the nut support surface 426 to the upper panel surface 424 and defines respective openings 430 and 432 for receiving and supporting respective tabs on a nut 104.

The respective heights of the base, the internal side walls of the cage and of the upper panel 424 (or its material thickness) are preferably comparable to the relative dimensions of those structures described with respect to the other cages described herein. For example, the height or material thickness of the base 402 is approximately one-third of the overall height of the receptacle, as is the height or material thickness of the upper panel 424, leaving the remaining approximately third of the height taken up by the interior of the cage.

The side wall thicknesses of the side walls 420 and 422, namely the material thickness between the interior wall surfaces of the side walls and the exterior wall surfaces of the side walls can be selected to reliably support any loading applied from the tabs of a nut 104 when under loading. In the example shown in FIGS. 29-31, the side walls are radiused on the inside and straight on the outside with transition radii to and from adjacent surfaces. In an alternative configuration, the side walls can slant or slope downwardly to join the upper surfaces of the adjacent lugs 408 and 410. In another example, the side walls can extend sideways to the outer edge surfaces of the respective lugs.

Forming, assembling and installing a nut plate assembly having the receptacle 400 can be accomplished in a manner the same as or similar to the other examples described herein.

In another example of a fastener receptacle such as a receptacle for receiving and supporting a fastener element, a receptacle 500 (FIGS. 32-33) is substantially identical to the receptacle 102 described with respect to FIGS. 1-14. The receptacle 500 receives and supports the nut 104 through a front-loading configuration with the cage 502 on a support 504. In the present example, the support 504 includes a downwardly-facing concave support surface 506 so that the support surface 506 is not planar. The curved support surface 506 allows the receptacle to be mounted on curved surfaces. In the configuration of the receptacle 500 shown in FIGS. 32-33, the curvature is with respect to a minor axis extending in the front-to-rear direction, with the right and left sides 508 and 510, respectively, curving away from and extending on opposite sides of the minor axis. The curvature of the support surface 506 is substantially constant as shown in FIGS. 32 and 33. In another example, the curvature can be concave relative to a major axis extending between the left and right sides of the receptacle, with the front and rear portions of the receptacle extending on opposite sides of the major axis. Alternatively, the curvature can be varied to accommodate the particular surface configuration of the underlying support structure.

In another example of a fastener receptacle such as a receptacle for receiving and supporting a fastener element, a receptacle 600 (FIGS. 34-36) is substantially identical to that described with respect to FIGS. 15-18, except as described with respect to this example and without the front and rear support elements 210 and 212. Additionally, the cage configuration, and therefore the intended nut configuration for use therewith, corresponds to the nut 104. However, the cage and nut configuration can be incorporated similar to that described with respect to FIGS. 15-21, or other nut configurations. In the example of the receptacle 600, the base 602 extends front to rear and from the right side 604 to the left side 606. The base 602 includes a convex support surface 608 so that the support surface 608 is not planar. The curved support surface 608 allows the receptacle to be mounted on curved surfaces that are concave. In the configuration of the receptacle 600 shown in FIGS. 34-36, the curvature is with respect to a minor axis extending in the front-to-rear direction, with the right and left sides 604 and 606, respectively, curving away from and on opposite sides of the minor axis. The curvature of the support surface 608 is substantially constant as shown in FIGS. 34 and 36. In another example, the curvature can be convex relative to a major axis extending between the left and right sides of the receptacle, with the front and rear portions of the receptacle curving away from and on opposite sides of the major axis. Alternatively, the curvature can be varied to accommodate the particular surface configuration of the underlying support structure.

As shown in FIG. 36, the receptacle 600 can include openings 610 having central axes 612 configured so that the axes extend normal to the support surface 608. In such a configuration, fasteners used to secure the receptacle 600 to the underlying support structure would extend normal to the underlying surface of the support structure adjacent the support surface 608. As a result, the fasteners and the surrounding support structure material may experience less side loading than if the fasteners were oriented otherwise. Alternatively, the openings and their central axes 612 can be oriented normal to the upper surface 614 of the receptacle 600 or at another angle. Additionally, the receptacle 500 shown in FIGS. 32 and 33 can also have their openings oriented normal to the underlying support surface 506 at the point where the openings exit the support surface 506. Other configurations are also possible.

In another example of a fastener receptacle for receiving and supporting a fastener element, a receptacle 700 (FIGS. 37-41) can be used to mount a component or other structure adjacent a corner of two other structures, for example adjacent a corner in two panels. In the present example, the receptacle 700 includes a base 702 that includes a bottom surface 704 forming a support surface 706 that is placed against an underlying support structure. In this receptacle, the support surface 706 is substantially planar to be placed against a correspondingly planar portion of a support structure. In the present example, the base is also substantially planar and has a uniform height or material thickness from the support surface 706 to the plane defined by a nut support surface 708. The base has a pentagon shape with two substantially equal-length right and left rear sides 710 and 712, respectively, and two substantially equal-length right and left front sides 714 and 716, respectively, the latter two of which are joined by front side 718. The right and left front sides are shorter in length than the right and left rear sides. As with each of the fastener element receptacles or receptacles described in these examples, the base 702 also includes an opening 720 for receiving a shank, shaft or other fastener element to be engaging the nut supported in the cage, described more fully below.

The receptacle 700 includes a least one, and in the present example two, securement portions on the base for helping to secure the receptacle relative to the support structure. In the present example, a right securement portion 722 and a left securement portion 724 are supported by and extend upwardly from the base 702. The right securement portion 722 extends upwardly from the base adjacent the right rear side 710, and the left securement portion 724 extends upwardly from the base adjacent the left rear side 712. They extend upward to upper edges 726 and 728, respectively. Each securement portion includes at least one, and if desired a plurality of, openings 730 for use in securing the receptacle to a support structure. The openings can be used to secure the receptacle in the same way that other receptacles described herein are secured. In the example shown in FIGS. 37-41, the right and left securement portions are substantially square with radiused edges and corners, and they allow the receptacle to be mounted to one or two support structures. In the case of being mounted to two support structures, the two support structures would be adjacent each other forming an approximate junction, such as a right angle corner. Other configurations of securement portions may be used, for example forming the securement portions as other than square configurations.

Each securement portion is coupled to the base and to the adjacent cage portion end by a reinforcement wall, such as right reinforcement wall 732 and left reinforcement wall 734. The upper portions of the reinforcement walls slope downwardly from approximate mid points of the securement portions to an upper portion of a fastener cage 736 (FIGS. 37-38), at an upper wall surface 738. The thickness of the reinforcement walls can be approximately the same as the thickness of the securement portions, as shown in the drawings, or the thicknesses can be different.

Figure 38:
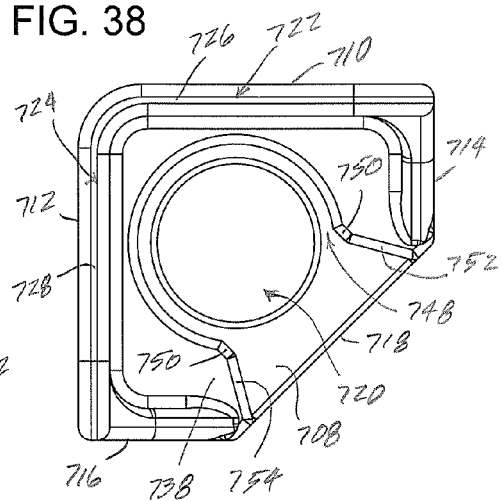
FIG. 38 is a top plan view of the receptacle of FIG. 37.
Figure 39:
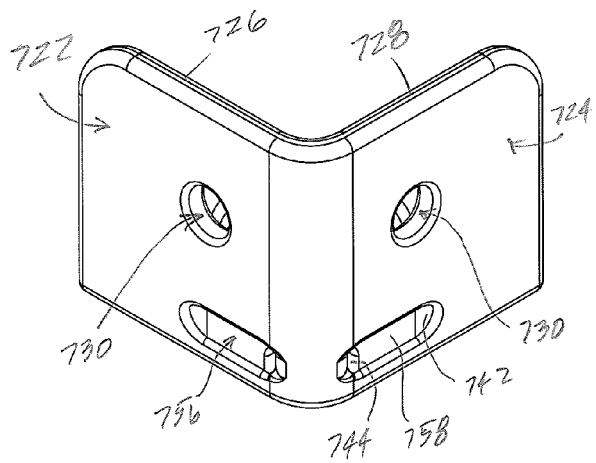
FIG. 39 is a rear upper isometric view of the receptacle of FIG. 37.
Figure 40:
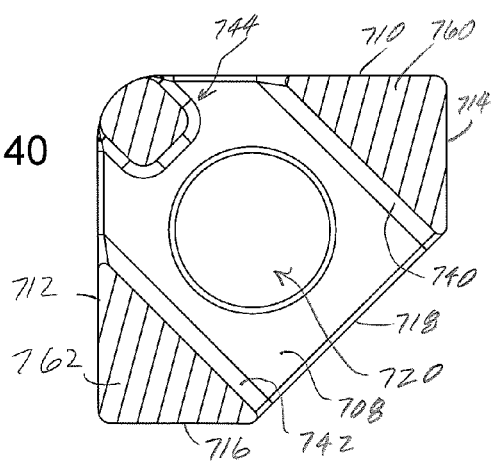
FIG. 40 is a horizontal section view of the receptacle of FIG. 37 taken along line 40-40 of FIG. 41.
Figure 41:
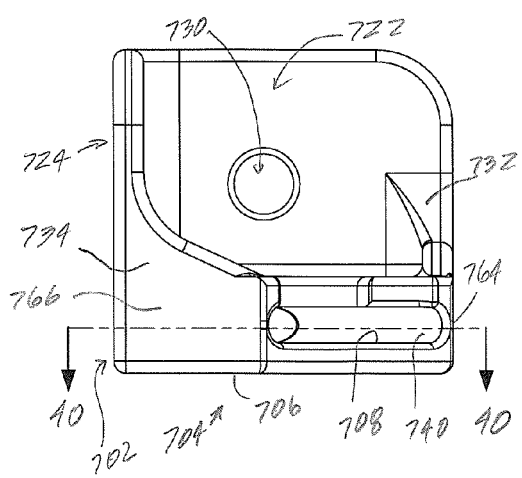
FIG. 41 is a left side elevation view of the receptacle of FIG. 37.

The base 702 also supports the cage 736 that supports a nut element, such as nut element 104. The cage extends above the nut support surface 708 and is configured to allow front loading of the nut into the cage. The interior surfaces of the cage are substantially similar to those for the cage described with respect to FIGS. 1-13, and include the substantially planar nut support surface 708, right and left radiused side wall surfaces 740 and 742 (FIG. 37) and a post or column 744 (FIG. 38). The right and left side wall surfaces and the post 744 extend upwardly from the nut support surface 708 to the upper cage wall 746, whose upper surface 738 forms the top surface of the cage. The upper cage wall includes a partially circular opening 748 (FIG. 38) defining an axially-extending opening for receiving and supporting a fastener element body such as the nut body 178. The opening 748 includes a restricted entrance defined by entrance walls 750 having a structure and function similar to that described with respect to walls 160 and 162. Approach ramp walls 752 and 754 help to guide the nut body into the opening 748.

The post 744 and the interior side walls 740 and 742 in the cage help to define right and left rear openings 756 and 758, respectively. The openings receive respective tabs on the nut element 104, which bear against respective surfaces when the nut pivots. For example, if the nut pivots in a counterclockwise direction as viewed from the perspective of FIG. 38, one tab will contact the post 744 and another tab will contact the left side wall surface 742. Additionally, one tab will contact the right side wall surface 740 near the front. When the contacts occur simultaneously, there will be three bearing surfaces limiting pivoting movement of the nut.

The right and left interior side walls 740 and 742 of the cage 736 are supported by support material 760 and 762, respectively, extending between the side wall surfaces and the right and left outside surfaces 764 and 766, respectively, of the cage. Portions of the support material are shown in a cross-section of FIG. 40 and extend vertically substantially the distance from the nut support surface 708 to the underside surface of the upper cage wall 746. The support material formed by the side walls form a substantial amount of bearing support for the interior side wall surfaces of the cage. As a result, the bearing surfaces against which corresponding surfaces of the nut bear under torque can withstand significant loading.

In the receptacle 700, three-points of contact are provided for limiting pivoting movement of the nut, and for releasably retaining the nut in the cage. The relative heights or material thicknesses of the cage elements and the base have the base forming an approximate third of the height of the base and cage combination, the upper cage wall 746 forming an approximate third of the height in the cavity in the cage for receiving the base of the nut forming an approximate other third. The cage also forms a back wall for the nut body limiting the directions in which the nut can be inserted into cage. As in all of the examples described herein for the base, such as base 702, the base is substantially incompressible, and in some examples inflexible, and reliably supports the nut at approximately the same height relative to the underlying structure under the base 702.

Figure 42:
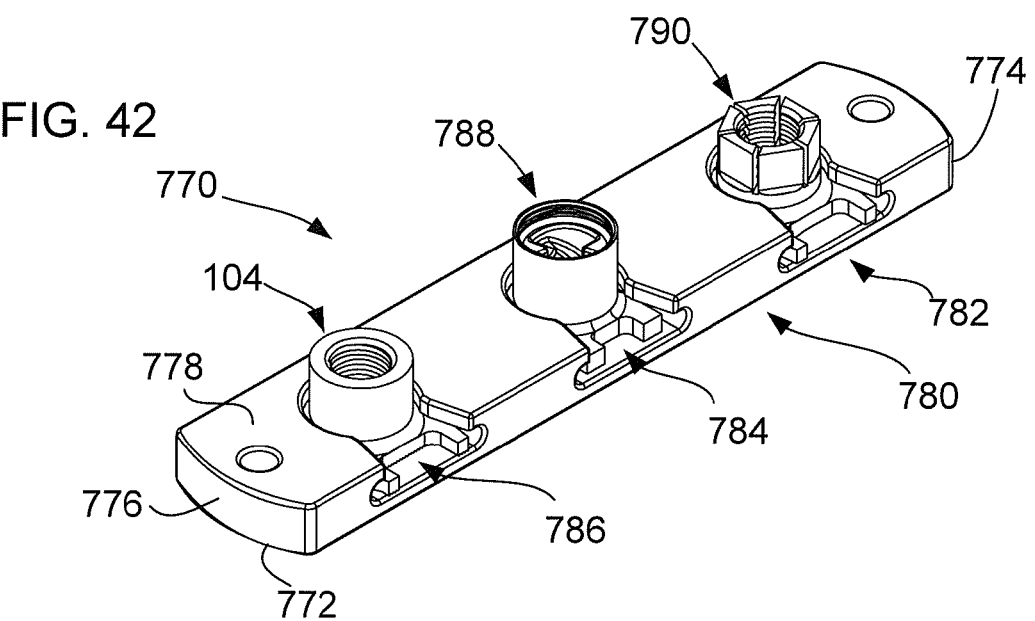
FIG. 42 is an upper left isometric view of another example of a fastener and receptacle combination.
Figure 43:
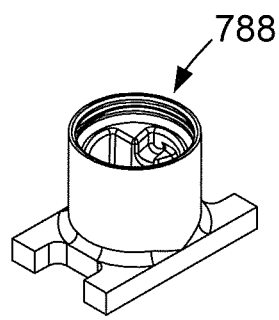
FIG. 43 is an example of a fastener element that can be used in the combination of FIG. 42, or any of the other fastener receptacles described herein.
Figure 44:
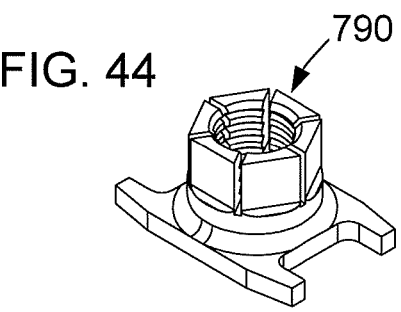
FIG. 44 is an example of another fastener element that can be used in the combination of FIG. 42, or any of the other fastener receptacles described herein.

Any of the fastener element receptacles described herein can be configured to accommodate more than one fastener element. As shown in FIG. 42, fastener element receptacle 770 includes a base 772, a right side wall 774, left side wall 776 and an upper wall 778. The front 780 includes a first, second and third cage areas 782, 784 and 786, respectively, for receiving corresponding fastener elements. In the present example, the fastener elements include the nut element 104, a quarter-turn receptacle 788 (FIG. 43) and a cycle nut 790 (FIG. 44). The nut element 104 shown in FIG. 42 includes serrations on the bottom surface thereof for having multiple points of contact between the nut element and the underlying support surface. The other fastener elements described herein can also have non-flat bottom surfaces as well, and may include other textured surface configurations. The same or different fastener elements can be incorporated into a multiple receptacle such as shown in FIG. 42. Each cage area can be identical or can be configured to accommodate a particular type of fastener element. The multiple receptacle can otherwise include any of the features described herein with respect to the other receptacles.

Fastener element and receptacles can also be configured for providing more than three points of support for limiting pivoting movement of the fastener element in the receptacle. In one example, additional tabs and additional bearing surfaces can be provided in a cage beyond the four tabs on nut 104 to produce more than three points of contact between the nut and the cage when the nut pivots under torque.

In another example of a fastener element and receptacle supporting a fastener element, a nut plate 800 (FIGS. 45-51) includes a receptacle 802 and an embedded nut element 804 with more than three points of contact limiting pivoting movement of the nut relative to the receptacle 802. The nut element 804 is molded in place in the receptacle 802.

The receptacle 802 includes a base 806 configured to be mounted on an underlying support structure, such as that described with respect to FIG. 14. The base extends longitudinally from a right side wall 808 to a left side wall 810 and transversely from a front wall 812 to a rear wall 814. The base includes a right securement portion 816 and a left securement portion 818, with respective holes 820 and 822 for receiving securement elements, which may be fastener elements, adhesive or other bonding elements, or other materials for securing the assembly to an underlying support structure.

Figure 45:
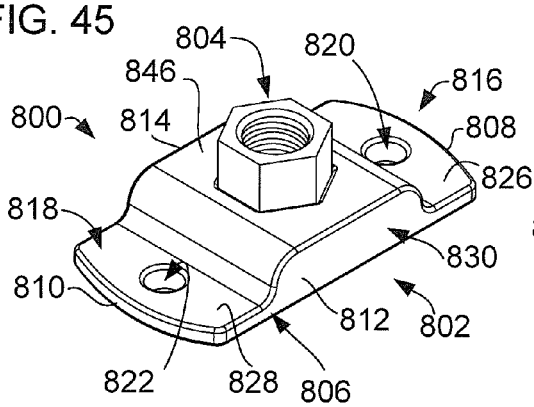
FIG. 45 is an upper left isometric view of an embedded fastener and receptacle combination.
Figure 46:
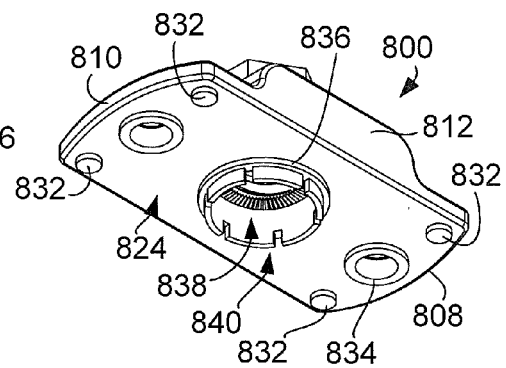
FIG. 46 is a lower left isometric view of the combination of FIG. 45.
Figure 48:
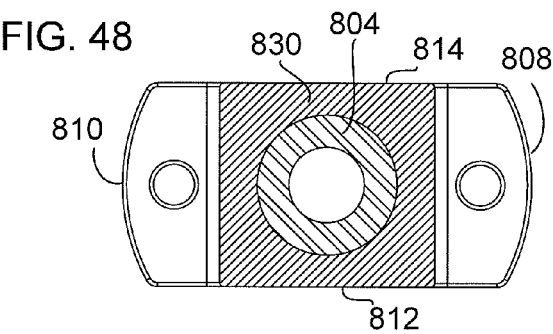
FIG. 48 is a horizontal section view of the combination of FIG. 45 taken along line 48-48 of FIG. 47.
Figure 47:
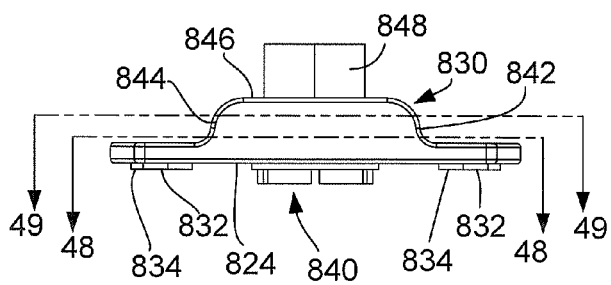
FIG. 47 is a front elevation view of the combination of FIG. 45.
Figure 50:
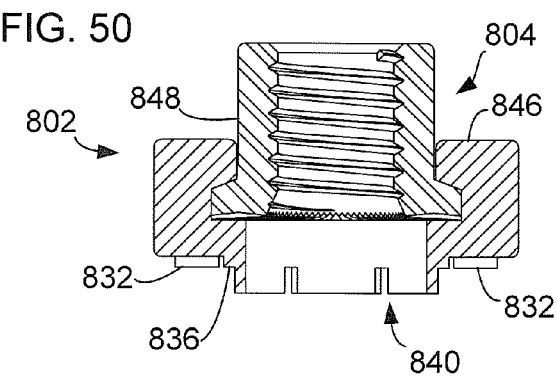
FIG. 50 is a transverse vertical section view of the combination of FIG. 45 taken along line 50-50 of FIG. 47.

In the present example, the base 806 is substantially planar and includes a substantially planar bottom support surface 824 (FIGS. 46 and 47) to be placed against an underlying support structure and secured thereto. The upper surface of the base, of which surfaces 826 and 828 are a part, supports a nut support and retaining structure 830 (FIGS. 45 and 47). The structure 830 supports and retains the nut element 804 in place. On the bottom support surface 824, for example where adhesive is used to help secure the nut support in place, spacer elements may be included. For example, spacer elements 832 are placed adjacent the four external corners of the support surface slightly in board from the adjacent edges. Additionally, spacer rings 834 can be placed about the lower rims around the openings 820 and 822. An additional spacer ring 836 can be included about the opening 838 extending through the base to the nut 804. Alternatively, the spacer elements can be omitted, for example if adhesive is omitted.

The base can also include a crenellated wall 840 extending axially outward from the bottom support surface 824 and around the opening 838. The outer diameter of the wall 840 is preferably less than the outer diameter of the spacer wall 836 so that the spacer wall 836 can bear against the underlying structure. The wall 840 is formed sufficiently long extending away from the bottom support surface 824 so as to engage and possibly extend into the corresponding opening in the underlying support structure. The wall 840 helps to position the fastener support element about the opening and to maintain its position on the support structure. The wall 840 can also be omitted.

Figure 49:
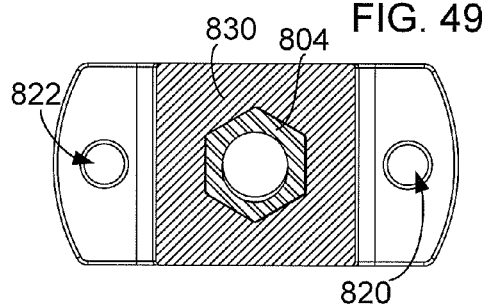
FIG. 49 is a horizontal section view of the combination of FIG. 45 taken along line 49-49 of FIG. 47.
Figure 51:
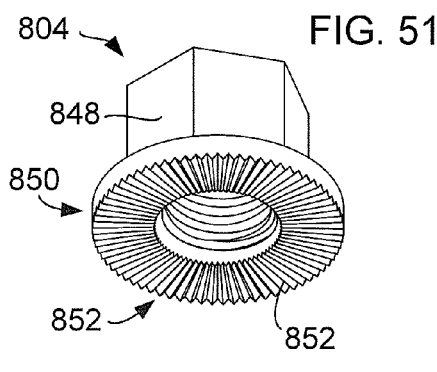
FIG. 51 is a lower isometric view of a fastener used in the combination of FIGS. 45-50.
Figure 57:
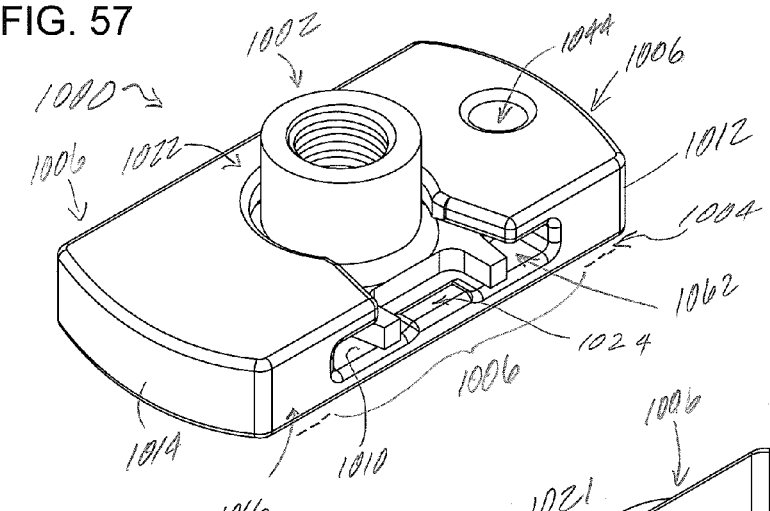
FIG. 57 is an upper left side isometric view of an example of a combination fastener and support according to another example configuration.

The nut support and retaining structure 830 extends substantially from the front wall 812 to the rear wall 814 and longitudinally from a right support wall 842 (FIG. 47) to a left support wall 844. The right and left support walls extend upwardly from the base 806 from points adjacent the openings 820 and 822, respectively, through radius transitions, through the support walls 842 and 844, and through radius transitions to a top surface 846 of the support structure. The top surface 846 substantially surrounds, encloses and engages hex surfaces or flats 848 on the nut element 804 (FIG. 51). The nut support and retaining structure 830 is shown in cross-section in FIGS. 48-49. In FIGS. 45 and 49, the support structure is shown surrounding and engaging the hex surfaces 848. The support structure helps to take up the loading from and limit pivoting of the hex nut 804 when torque is applied. Other non-circular configurations can also be used. The support structure has more than three-point contact helping to limit pivoting of the hex nut 804.

Additional points of bearing contact to take up loading when loading is applied to the nut element 804 can be included in the assembly 800. For example, other non-circular surfaces can be used about the perimeter of the nut element or on other surfaces of the nut element to engage walls or bearing surfaces on the nut support for limiting or preventing pivoting of the nut element relative to the nut support. The non-circular surfaces can take any of the configurations referenced herein. When torque is applied to the nut, the non-circular surfaces engage the bearing surfaces to limit or prevent pivoting.

The hex nut 804 includes a base 850 having serrations 852 on the bottom surface thereof. The serrations provide an easy and an efficient way to have a relatively large number of engagement positions. When the hex nut 804 engages complementary surfaces formed or molded in the nut support 802, the serrations 852 bear against the nut support, thereby resisting rotation through the serrations, which may be considered projections, in combination with the hex surfaces 848 for helping to limit pivoting of the nut element in the nut support. The surfaces of the nut support contacted by the serrations are bearing surfaces as to which the engagement positions between them and the nut serrations limit or prevent rotation or pivoting of the nut relative to the nut support. In this example, both the serrations and the hex surfaces help to limit rotation or pivoting of the nut relative to the support.

In other examples, the serrations in any of the nut examples can be substituted by knurling, diamond points or other engagement portions. Serrations, knurling or diamond points, for example, provide a relatively large number of contact points, lines or planes to accommodate the loading while the nut is under torque. Such engagement portions can be placed on multiple surfaces of the fastener element. In the nut element example 804, additional or substitute engagement portions can be included on the outer perimeter surface of the base 850, for example. Where substitute serrations are placed on the outer perimeter surface of the nut element, the nut can be press-fit into the nut support rather than molded in place. The serrations would limit pivoting of the nut element when torque is applied. Any of the nut elements described herein can be configured to include serrations, hex surfaces and/or other non-circular surface portions for contacting surfaces in a receptacle.

Another example of a fastener element and receptacle supporting a fastener element includes a nut plate 900 (FIGS. 52-55) having a receptacle 902 and an embedded nut element 904 having more than three points of contact limiting pivoting movement of the nut relative to the receptacle 902. The nut element 904 is molded in place in the receptacle 902.

The receptacle 902 includes a base 906 substantially identical to the base 806 described with respect FIGS. 45-49. The examples of the base described with respect to the base 806 configurations apply similarly to the base 906. Therefore, the base 906 will not be discussed further.

The base 906 includes an upper surface 908 supporting the nut support and retaining structure 910. The nut support and retaining structure 910 supports and retains the nut element 904 in place. The structure 910 is substantially circular in horizontal cross-section, and extends from adjacent the front side wall of the base to adjacent the rear side wall of the base. The structure 910 extends upwardly from the base through a radius transition to a substantially vertical cylindrical wall portion 912, which extends upwardly to a radius portion that turns inward to an upper surface 914. The wall portion 912 has a substantially constant wall thickness at any given vertical level, but the thickness varies from a lower half 916 at one average thickness to an upper half 918 at a second average thickness. The thicknesses are described as average thicknesses because of the radially extending serrations on the nut element 904 (described more fully below) engaging the adjacent interior wall of the lower half 916. In any case, the thickness of the wall portion 912 is preferably such as to reliably retain and support the nut element 904 and limit pivoting of the nut element 904 when torque is applied. The thickness and the configuration of the wall 912 can be adjusted as desired as a function of the material used, the expected loading on the combination, and other operating conditions.

The nut element includes a nut body 920 with an internally threaded bore 922 wherein the threads extend approximately half the length of the bore. The lower half of the bore may be smooth. The upper half of the nut body 920 may include a substantially smooth outer surface 924 extending from an upper rim surface 926 to a circumferential rim 928. The circumferential rim 928 includes a substantially flat upper surface 930 turning downward to a round circumferential surface 932, which terminates in a bottom surface 934. In the example shown in FIGS. 52-55, the bottom surface 934 includes a plurality of downwardly facing, radially extending serrations 936. The serrations 936 engage the upper surface 914 of the cylindrical wall portion 912 on the nut support. In one configuration, where the nut is molded in the nut support, complementary surfaces are formed in the upper surface 914 when the nut support is molded. Alternatively, the serrations 936 can be pressed into the upper surface 914, and/or ultrasonically welded through, during or after the insertion process, and the serrations 936 can be imbedded into the upper surface 914.

The serrations 936 extend radially inward in the bottom surface 934 about halfway or two-thirds of the radial distance to a recessed cylindrical wall 938. The remainder of the radial distance to the wall 938 is an upwardly-recessed wall 940, recessed below the lower-most extent of the serrations 936. The wall 940 intersects the axially-extending cylindrical wall 938, and wall 938 has an outside diameter less than that of the body 924 and also of the circumferential surface 932. The wall 938 forms a recess between the bottom surface 934 and a plurality of radially outward extending and axially extending serrations 942. The wall 938 takes up about half the distance between the lower surface 934 and the bottom surface 944 of the nut element. The upper surfaces 946 of the serrations 942 are substantially flat horizontally, while the lower edges of the serrations curve inwardly to the lower surface 944. The serrations 942 engage the interior surface of the lower portion 916 of the wall portion 912. In one configuration, where the nut is molded in the nut support, complementary surfaces are formed in the wall portion 912. Alternatively, the serrations 942 can be pressed into the interior surfaces of the wall portion 912.

Additional or alternative points of bearing contact to take a loading when loading is applied to the nut element 904 when torque is applied can be included in the assembly 900. For example, other non-circular surfaces can be used about the perimeter of the nut element or on other surfaces at various locations on the exposed surfaces or about the outer surface of the nut element to engage walls or bearing surfaces on the nut support for limiting or preventing pivoting of the nut element relative to the nut support. The non-circular surfaces can take any of the configurations referenced herein. When torque is applied to the nut, the non-circular surfaces engage the bearing surfaces to limit or prevent pivoting.

In another example of a fastener element and a receptacle supporting a fastener element, a nut plate 900A (FIG. 56) includes the receptacle 902, in this example identical to the receptacle 902 in FIGS. 52-53, having an embedded nut element 904, also identical in this example to the nut element 904 in FIGS. 52-53. All of the structures and functions and methods of using the combination of FIGS. 52-55 apply to the combination 900A except as discussed below.

In the present combination, the nut plate 900A includes a cover, cap, or other protector, for example cap 950 in FIG. 56. The cap 950 covers the nut element 904 with a domed body 952 then extends completely around the circumference of the nut element and covers the top of the nut element. The cap helps to protect the nut element and any fastener threaded into the nut element, and helps to keep debris, fluids and other outside material from getting to the nut element. The cap 950 in the present example includes a rim 954 with an inwardly-extending wall 956 extending into and engaging a circumferential and outwardly-extending groove 958 in a circumferential surface of the receptacle 902. Inter-engagement between the wall 956 and the groove 958 helps to hold the cap in place on the receptacle 902.

The cap 950 may also include a circumferential groove 960 extending around the inside surface of the cap and under the wall 956. A portion of the upper half 918 of the wall portion 912 can extend into and engage the circumferential groove 960, helping to hold the cap in place. Other cap configurations can be included. Some examples will have the cap shape conforming to the external shape of the receptacle. Additionally, any of the combinations of fastener element and receptacle described as examples herein can include a cap or other cover, such as described with respect to FIG. 56.

The cap 950 material preferably allows slight flexibility so that the open end of the cap can be manually placed over the receptacle body without requiring excessive force. Example materials include rubber, rubber-like materials and other elastomeric materials generally softer than the structural plastics that might be used to make the cap. Example materials can include Nitrile rubber, Teflon, Silicone or Fluorosilicone, Viton, Kalrez, Santoprene TPEs, or other acceptable materials determined by specific applications. The cap may also be formed so as to have discreet tabs or fingers that extend axially of the cap to engage corresponding surfaces on the receptacle. The material of the cap in such examples can include plastic, including for example a structural plastic such as TORLON, other polyamide-imides or similar polymers can be used including, among others; Vespel or Aurum (PI), Ultem (PEI), Victrex or Ketaspire (PEEK), Primospire (SRP), Polycarbonate, or Epoxide or Phenolic synthetic resins, or softer plastics. The material can also be a composite material and may include fiber reinforcement or other strengthening materials. Other materials, including metals or elastomers or any combination thereof may be used, but plastics are relatively easier to manufacture.

As an alternative to a cap, the nut element could be a closed-ended nut element. Such closed-ended nut elements could be used with any of the examples of nut and receptacle combinations discussed herein. An example of a closed-ended nut element is shown in phantom at 962 in FIG. 53.

A combination fastener element and support for the fastener element includes a fastener support 1000 (FIGS. 57-60) and a fastener element 1002 supported in the fastener support. The support 1000 includes a base 1004 and a structure 1006 on the base for receiving the fastener element 1002. The width-wise extent of the structure 1006 may vary as a function of the desired structural support for torque loading that may be expected under operating conditions. The base 1004 can be substantially planar and may include a bearing support structure 1008 on the outward-facing portion of the base 1004. Alternatively, the base can have a curved or complex shape.

On a side of the base opposite the bearing support structure 1008, the base supports the fastener element 1002, for example on a nut support surface 1010. The nut support surface 1010 can be substantially centered between a right end 1012 and a left end 1014, and may extend from a front base wall 1016 to a rear base wall 1018. Alternatively, the nut support surface can be positioned at other locations on the base. For example, the nut support surface can be positioned in ways similar to those shown in the other examples described herein, as well as in other configurations. In the present example, the fastener element 1002 is inserted into and removed from the support from only one side of the support, for example from the front. Also in this example, the fastener element is limited in its ability to pivot relative to the support by oppositely-facing side walls, 1019 and 1020, respectively, as well as by an end wall such as that provided by a column 1021. The end wall may be provided by a post, boss, rib or other projections extending between the nut support surface 1010 and an upper wall 1022. Further walls or surfaces may be provided for limiting pivoting movement of the fastener element. In the example shown in FIGS. 57-60, a boss 1024 may include one or more bearing surfaces, such as surfaces 1026 and 1028 against which corresponding surfaces on the element may bear when the nut element pivots. In the configuration of the combination shown in FIGS. 57-60, the nut element and the adjacent surfaces on the support can be configured so that more than 2 or more than three surfaces together limit pivoting movement of the fastener element.

The bearing support structure 1008 in the example shown in FIGS. 57-60, includes a plurality of projections from a flat underside 1030. The projections may take a number of configurations. They can have geometric shapes, or complex shapes, and they may extend the same distance from the surface 1030 or different distances. The projections may include cylindrical buttons or bosses 1032, linear-extending ribs 1034, arcuate ribs 1036, bosses 1038, posts such as post 1040 and crenellated walls 1042. The projections shown in the present example extend the same distance except for the crenellated walls 1042. The projections may help to position the combination on an underlying support structure, and the may also help to securely combination in place. For example, the crenellated walls 1042 may extend into a corresponding opening in the underlying support structure to help register the combination relative to be corresponding opening. The post 1040 may also extend into a corresponding opening in the underlying support structure to help register the combination. Additionally, adhesive may be used between the flat underside 1030 and the underlying support structure to help hold the combination in place. The bosses 1032, 1038, ribs 1034 and 1036 and the crenellated walls 1042 may help with the adhesive to more securely hold the combination placed on the underlying support structure. One or more of the individual projections can be omitted or other or additional projection configurations can be used to either or both help position and/or hold the combination in place. Additionally, where adhesive is used and openings such as fastener opening 1044 is provided, adhesive extending into or through the opening may further help to hold the combination in place. The bearing support structure in another alternative can be a smoothed surface, or can have a textured or a multi-faceted surface.

Various structures may be used to help hold the combination in place, including those described above. In the combination shown in FIGS. 57-60, plural openings 1044 can be included, or they can be omitted. For example, an additional opening can be provided where the post 1040 is positioned, in a manner similar to the securing portions described with respect to other examples. Eyelets can also be included. Additionally, a plurality of posts 1040 can be included or omitted. For example, a post 1040 can be used in place of the opening 1044. Also, in any of the foregoing configurations, one or more of the projections from the bottom surface 1030 can be omitted or changed from the configurations shown in the example, as desired.

Figure 58:
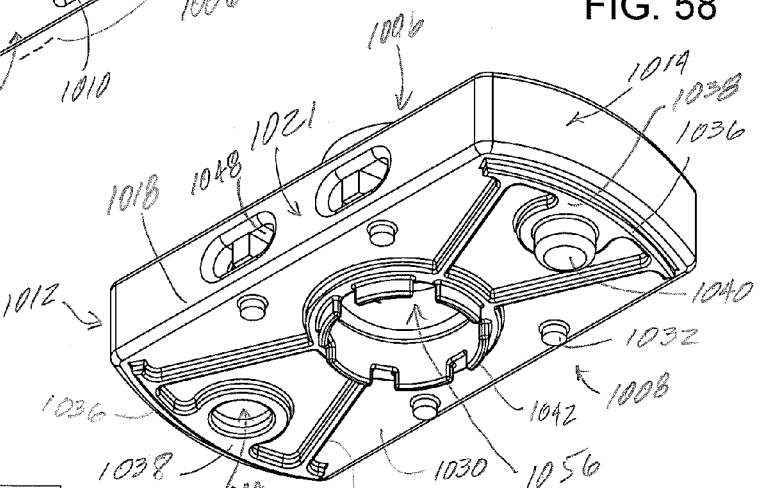
FIG. 58 is a lower left isometric view of the combination of FIG. 57.
Figure 59:
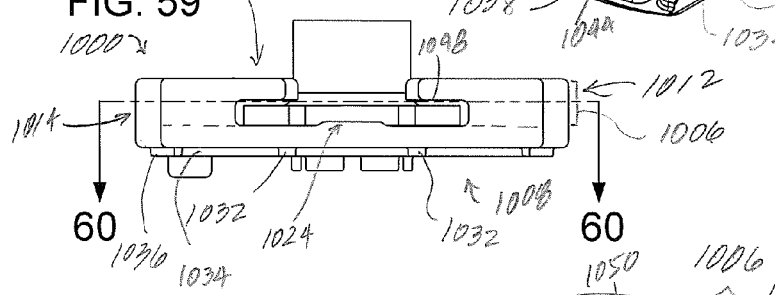
FIG. 59 is a front elevation view of the combination of FIG. 57.
Figure 60:
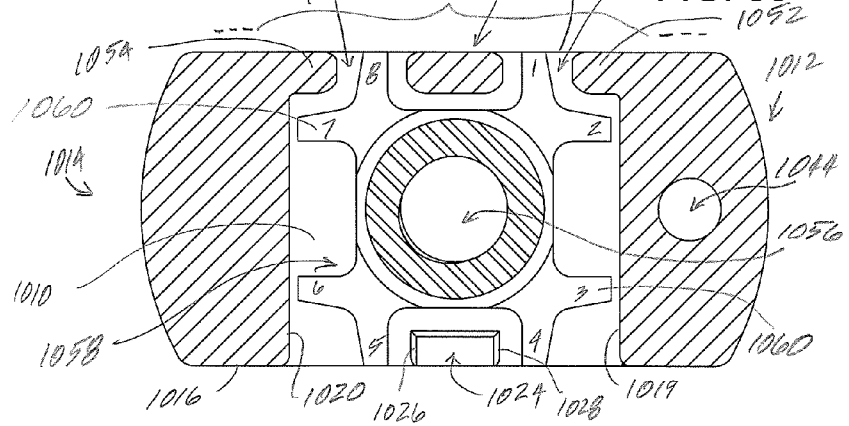
FIG. 60 is a horizontal cross section of the combination of FIG. 57 taken along line 60-60 of FIG. 59.

The structure 1006 on the base and supported by the base is a support structure, which in turn supports the fastener element 1002. The support structure provides bearing support surfaces that accommodate torque loading applied when the fastener element is under torque. The support structure 1006 can be configured to accommodate any of the fastener element configurations described herein, as well as other configurations. The support structure also allows the fastener element to float a desired amount along an axis substantially perpendicular to the base 1004. The support structure 1006 forms a partial enclosure for the fastener element and includes the side walls 1019 and 1020 and an upper wall surface 1048 (FIGS. 58-59). The side walls 1019 and 1020 and the upper wall surface 1048 can have configurations substantially similar to those the structures described with respect to the other examples, for example those for FIGS. 1-36. The support structure further includes the column 1021 and the boss 1024. As shown in FIG. 60, the support surface 1010 extends widthwise between the right and left side walls, 1019 and 1020, respectively, and from the front wall 1016 to the back wall 1018. The support surface 1010 extends through respective left and right openings 1049 and 1050, respectively. The openings are defined on the bottom by the support surface 1010 and on the top by the upper support 1022. The openings are defined on the sides by the column 1021 and by left and right inwardly-extending side walls 1052 and 1054. The side walls 1052 and 1054 extend inwardly toward each other and toward column 1021 from the respective side walls 1019 and 1020, respectively. The side walls 1052 and 1054 include surfaces forming bearing surfaces against which corresponding surfaces on the fastener element 1002 bear when the fastener element is under torque.

The support structure for the fastener element in the example of FIGS. 57-60 can take a number of configurations, including those described in the examples of FIGS. 1-42, or the fastener element can be embedded in a support structure such as those described with respect to the examples of FIGS. 45-53. Where multiple securing portions are included with openings 1044, the left and right sides of the support structure can include respective openings 1044. The support structure shown in FIGS. 57-60 has a relatively flat top surface for the upper surface 1022 extending between the left and right sides, but the upper surface can take other configurations, including that shown in the example of FIGS. 1-13.

The support structure 1006 in the configuration shown in FIGS. 57-60 includes a plurality of bearing surfaces for helping to limit pivoting of the fastener element when the fastener element is under torque. Generally, any of the surfaces on the support surface 1010, the side walls 1019 and 1020, the column 1021, the boss 1024, the side walls 1052 and 1054, as well as any surfaces that might be included depending from the upper wall 1022, that have a portion or a component extending at least partially vertically can serve as bearing surfaces helping to limit pivoting of the fastener element 1002, when the fastener element is under torque about an axis of the fastener opening 1056 (FIG. 58). The particular surface or surfaces that will be contacted by the fastener element will depend on the configuration of the fastener element adjacent the surfaces as well as the spacing between the surfaces and the fastener element. One example configuration will be described with respect to the combination of FIGS. 57-60.

Figure 4:
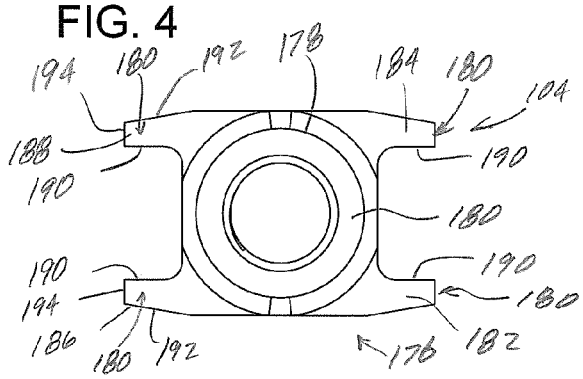
FIG. 4 is a top plan view of a fastener element for use in the assembly of FIG. 1.

The fastener element 1002 is substantially the same as the example described with respect to FIG. 4 except for the configuration of the base. Therefore, only the base of the fastener element 1002 will be described in detail. In the configuration of the fastener element shown in FIGS. 57-60, the fastener element is a nut with a base portion 1058 having a bottom surface and a substantially circular wall defining a hole leading into the barrel of the nut. The base portion of the nut includes a plurality of surfaces configured for engaging one or more engagement surfaces in or on the fastener support. In the example shown in FIGS. 57-60, the base portion 1058 includes a plurality of tips or tabs 1060 extending outward from the base of the nut, within the plane of the base of the nut. The tips may take the form of points, projections, extension surfaces or other non-circular elements for engaging corresponding bearing surfaces in or on the nut support. They may be oriented on the base in a symmetric pattern, an asymmetric arrangement, with an even or uneven number of tips, with the same or different lengths, with the same or different surface configurations, and with the same or different shape configurations. In the example shown in FIGS. 57-60, each of the tips 1060 and their configurations correspond to tip configurations in a conventional "H" nut base (see FIG. 4) extending longitudinally of the nut support (right to left in FIG. 60) and it further includes tips corresponding to tips in a conventional "H" nut base extending transversely of the nut support (front to back in FIG. 60). In such a configuration, there are two pairs of four tips each, with a total of 8 in the example. In this configuration, the nut can be loaded into the cage of the support in any one of four configurations, corresponding to pairs of two tips each, each extending in the same direction. The tips are arranged to be symmetric with respect to a vertical plane extending longitudinally, and also with respect to a vertical plane extending transversely. In other examples, the base can have tips in other numbered arrangements, they can extend radially, or extend in other uniformly-arranged directions, or in non-uniform arrangements. They can also have surfaces other than flat, but it is noted that each tip makes the base of the nut non-circular so that the tip can bear against a bearing surface in the nut support when torque is applied to the nut. Other configurations for the nut can be used which provide one or more non-circular surfaces for helping to limit pivoting of the nut when the nut is under torque.

In the nut support described with respect to FIGS. 57-60, the bearing surfaces preferably have a size and mass to withstand, when combined with any other bearing surfaces, expected loading from the tips when torque is applied to the nut. In the present example, the tips on the nut and at least two and preferably more than three bearing surfaces on the nut support are configured so that respective tips contact respective bearing surfaces substantially simultaneously when torque is applied to the nut. For example, the side walls 1019 and 1020 and tip numbers 3 and 7, respectively, make contact substantially simultaneously when the nut pivots counterclockwise, as viewed in FIG. 60. Similarly, the side walls 1019 and 1020 and tip numbers 2 and 6, respectively, may contact substantially simultaneously when the nut pivots clockwise, as viewed in FIG. 60. Such arrangement provides at least two points of contact substantially simultaneously when the nut pivots in the nut support. Additionally, additional point contact can be provided if tip 1 contacts the adjacent surface of the column 1021 when the nut pivots counterclockwise, and if tip 1 contacts the adjacent surface of the side wall 1052 when the nut pivots clockwise. Further point contact can be provided in the same manner with tip 8 and its adjacent surfaces. Additional point contact can be provided between surfaces on the boss 1024 and the adjacent surfaces of tips 4 or 5. Therefore, multiple points of contact can be provided as a function of the nut configuration and further as a function of both the nut configuration and the configuration of the nut support.

It is to be understood that the phrase "point of contact" is not limited to literal point of contact but includes line contact and surface contact. The form of the contact and the extent of contact will depend on the configurations of the adjacent surfaces and how the nut pivots to produce the contact. The form of the contact may also depend on how much the nut can move laterally within the cage of the nut support. The cage surfaces can have straight or rounded surface configurations, or more complex surface configurations. Likewise, the surfaces on the nut intended for making contact with adjacent surfaces in the cage can have a number of configurations.

In the example shown in FIGS. 57-60, the top, bottom, side and end surfaces of each tip are formed substantially flat. Depending on which tip engages which cage surface, a side surface of the tip can engage a cage surface, an end surface may engage a cage surface or a corner may engage a cage surface. Additionally, surfaces on top or bottom portions of the base of the nut can engage adjacent surfaces in the cage. If contacting surfaces are substantially complementary to each other, loading applied through a given tip to an adjacent surface in the cage may be spread over more of the surface area for the contacting surfaces, allowing the structures to more easily support the nut element against torque. The more surfaces and surface area taking the loading, the greater is the distribution of loading, and likelihood of damage or failure of the part, if any, is reduced. Additionally, the dimensions of the base, tips and cage surfaces, their positioning and relative spacing can be selected so that pivoting of the nut results in contact between as many engagement portions and bearing surfaces as practicable. The particular form of the engagement position for a combination of nut surface and cage surface will be determined by the configurations of the respective surfaces and their relative orientation at contact. Additionally, the forms of contact through the surfaces such as those shown in FIGS. 57-60 can be configured to be the same for nut pivoting either clockwise or counterclockwise, though they can be otherwise. As can be seen from the example, bearing surfaces in the nut support can be formed from straight or radiused walls, bosses, posts or columns, openings, cantilever walls, flanges, as well as other structures.

The nut 1002 can take a number of configurations, and the nut support can be configured to provide the desired bearing surfaces as a function of the nut configuration. Alternatively, the nut support can be configured and then the nut can be designed to apply loading best suited to the nut support designed. In the present example, the nut support is formed as a monolithic element, and as noted herein can be formed from or molded with a non-metal material. The support surface 1010, the side walls 1019 and 1020, end walls 1052 and 1054, column 1021 and boss 1024 and upper wall 1022 form a nut cage for retaining the nut in the cage once inserted. The cage may be configured to allow the nut to float axially and to pivot a certain amount, as desired before pivoting is stopped.

A front opening 1062 is formed in the front wall 1016 of the nut support. The width of the opening is slightly larger than the overall width of the nut element 1002. The height of the opening is sufficient to allow the nut to be inserted over the boss 1024 and below the upper wall 1022. In one example, the height or material thickness of the base of the nut is about two-thirds of the internal height of the cage between the support surface 1010 and the underside surface of the wall 1022, and the height of the boss 1024 is about ¼ of the height of the cage. This allows the nut element to be inserted over the boss 1024, and allows the nut to float while still allowing the boss 1024 to help limit pivoting of the nut. Other configurations can also be used. The entrance to the opening for allowing the barrel of the nut element to pass can be substantially the same as those described with respect to the other examples described herein.

The nut plates described herein can be formed from the same materials as has been described for any of the given nut plates examples, and they can be formed in the same manner, with variations or adjustments being made for the given configuration. Each can include suitable mounting configurations appropriate for the application, including by fastening such as with rivets or other mechanical fasteners or with adhesives or other bonding agents. They can also include if desired spacer areas for giving spacing for an adhesive layer. Each nut support or receptacle can include multiple bearing support surfaces against which similar or identical numbers of nut surfaces can bear for limiting pivoting of the nut. They can also include nut cages that are asymmetrical, have closed sides for example with a single access opening for insertion and removal, as well as a restricted access opening for helping to retain the nut in the cage. Each can be molded, allowing flexibility in selecting features to be included in the configuration, as well as optimizing structures incorporated into the nut plate. They can also be configured to accommodate a particular nut configuration.

The nut plate assemblies can be used in a number of applications. They can be used for mounting components to interior portions of a panel, to panel corners, or to panel edges. They can be used to mount components to structures that are planar, concave, convex or to structures having complex surface configurations. They also can be used to mount components to multiple structures.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A fastener receiver comprising:
a non-metal support and fastener cage formed monolithic with respect to each other wherein
the non-metal support includes a support surface on a first side of the support for being supported by a structural support when the fastener receiver is placed against the structural support, wherein the support surface extends in substantially two dimensions, and the non-metal support further includes at least one securing portion spaced laterally from the fastener cage for securing the fastener receiver to the structural support surface, and the non-metal support further includes a fastener support surface on a side of the support substantially opposite the support surface and configured to support a facing portion of a fastener; and a threaded nut in the fastener cage and having a facing portion and wherein the fastener cage is configured to receive and support the threaded nut such that the facing portion is supported on the fastener support surface of the support, the fastener cage being positioned on a side of the support substantially opposite the support surface, the fastener cage having at least two side surfaces for limiting pivoting movement of the threaded nut, and the fastener cage having a second fastener support spaced apart from the fastener support surface of the non-metal support and including a wall extending between and contacting at least two of the at least two side surfaces and further including a projection positioned between the two side surfaces and extending upward from the fastener support surface of the support toward the wall.

2. The fastener receiver of claim 1 wherein the non-metal support and fastener cage are molded plastic.

3. The fastener receiver of claim 2 wherein the non-metal support and fastener cage are polyamide imide.

4. The fastener receiver of claim 2 wherein the non-metal support and fastener cage are formed from at least one of an engineered thermoplastic, thermoset or composite polymers.

5. The fastener receiver of claim 1 wherein the support surface on the first side of the non-metal support is substantially planar.

6. The fastener receiver of claim 1 wherein the wall includes a bridge portion.

7. The fastener receiver of claim 6 wherein the at least one securing portion is on a first side of the fastener cage and further including a second securing portion and wherein the second securing portion is positioned on a side of the fastener cage opposite the at least one securing portion.

8. The fastener receiver of claim 7 wherein the fastener cage includes a wall defining an opening facing in a direction other than toward the at least one securing portion and the second securing portion.

9. The fastener receiver of claim 6 wherein the second securing portion is positioned on a side of the fastener cage other than opposite the at least one securing portion.

10. The fastener receiver of claim 1 wherein the fastener support surface is substantially centered on the support.

11. The fastener receiver of claim 1 wherein the fastener cage includes a wall defining an opening into which a portion of the threaded nut element extends.

12. The fastener receiver of claim 11 wherein the opening is a side opening for inserting and removing the threaded nut element.

13. The fastener receiver of claim 11 wherein the opening has a threaded nut element opening and wherein the fastener receiver further includes a fastener opening through the support and wherein the threaded nut element opening is substantially coaxial with the fastener opening of the fastener receiver.

14. The fastener receiver of claim 1 wherein the support surface is substantially circular.

15. The fastener receiver of claim 1 wherein the support surface is substantially elongate.

16. The fastener receiver of claim 1 wherein the threaded nut element includes a base and a fastener housing, and wherein the base is supported by the fastener support surface so as to allow threaded nut element to move relative to the fastener cage, and wherein the threaded nut element is positioned at least partly within the fastener cage.

17. The fastener receiver of claim 16 wherein the threaded nut element extends through an opening in the fastener cage opposite the fastener support surface.

18. The fastener receiver of claim 16 wherein the threaded nut element base includes a plurality of engagement elements and the fastener cage includes a plurality of engagement surfaces and wherein pivoting movement of the threaded nut element moves the fastener engagement elements into engagement with the engagement surfaces of the fastener cage.

19. The fastener receiver of claim 18 wherein the threaded nut element base has a substantially H configuration.

20. The fastener receiver of claim 16 wherein the fastener is molded in the fastener receiver.

21. The fastener receiver of claim 16 wherein the fastener receiver is a nut plate.

22. A fastener receiver comprising:

a non-metal support and fastener cage integral with each other wherein the non-metal support includes a support surface on a first side of the support for being supported by a structural support when the fastener receiver is placed against the structural support, wherein the support surface extends in substantially two dimensions, and the non-metal support further includes at least one securing portion spaced laterally from the fastener cage for securing the fastener receiver to the structural support surface, and the non-metal support further includes a fastener support surface on a side of the support substantially opposite the support surface and configured to support a facing portion of a fastener;

the fastener cage is configured to receive and support a fastener element having a facing portion for being supported on the fastener support surface of the support, the fastener cage being positioned on a side of the support substantially opposite the support surface, the fastener cage having at least two side surfaces for limiting pivoting movement of a fastener, and the fastener cage having a second fastener support spaced apart from the fastener support surface of the non-metal support and including a wall extending between and contacting at least two of the at least two side surfaces; and wherein the at least one securing portion includes a wall defining an opening for receiving a fastener.

23. A fastener receptacle comprising:

a non-metal support and fastener cage integral with each other wherein the support has a support surface configured to be placed against a support structure, wherein the support has a wall defining an opening for receiving a male fastener, the support includes a fastener element support surface configured such that the opening extends from the support surface to the fastener element support surface, and wherein the fastener cage includes a lateral opening for receiving in a lateral direction a fastener element and the fastener cage further includes at least three torque-resisting elements extending away from the support surface and away from the fastener element support surface, wherein at least one of the torque-resisting elements is positioned substantially opposite the lateral opening, and wherein the at least three torque-resisting elements are configured to be contacted by respective surfaces on a fastener element base when the fastener element is positioned in the fastener cage and the fastener element is pivoted relative to the fastener cage.

24. The fastener receptacle of claim 23 wherein the at least three elements includes first and second side walls and a post positioned between the first and second side walls.

25. The fastener receptacle of claim 24 wherein the post and the first and second side walls define respective sides of respective openings, and wherein the fastener receptacle further includes a fastener element positioned in the fastener cage, wherein the fastener element includes tabs extending into respective ones of the openings so that the post is positioned within a cavity defined by tabs of the fastener element.

26. The fastener receptacle of claim 25 wherein the fastener element includes a fastener base having two pairs of tabs.

27. The fastener receptacle of claim 25 wherein the fastener element is removable.

28. The fastener receptacle of claim 25 wherein the fastener cage includes a wall defining an opening and wherein the fastener element includes a fastener body extending through the opening.

29. A fastener receptacle comprising a receptacle having a support surface configured to be placed against a support structure, and a fastener cage on a side of the receptacle opposite the support surface, wherein the receptacle extends longitudinally and includes a first longitudinal side on a front of the receptacle and a second longitudinal side on a back of the receptacle, and wherein the fastener cage includes walls defining a front opening configured to receive a fastener element only laterally into and allow only lateral removal of a fastener element from the fastener cage through the front opening and walls at the back of the receptacle defining a plurality of openings, and a threaded nut in the fastener cage having tabs extending into respective ones of the plurality of openings.

30. The receptacle of claim 29 wherein the threaded nut can be inserted into the cage only through the front opening.

31. The receptacle of claim 30 wherein the receptacle includes a first end having a first mounting element and a second end having a second mounting element and wherein the front opening is between the first and second ends.

32. The receptacle of claim 29 wherein the front opening includes an entrance wall having spaced apart sides defining an entrance width and wherein the cage further includes an opening having a diameter for receiving a body of the threaded nut and wherein the entrance width is less than the diameter.

33. A fastener receiver comprising:
- a base having a first surface for being supported on a support structure and a second surface for supporting a fastener element with an edge extending from the first surface to the second surface;
- a structure on the base for supporting a fastener element wherein the structure is at least partly asymmetrical about a longitudinally extending plane other than a horizontal plane parallel to the base; and
- means for securing the base to a support structure.

34. The fastener receiver of claim 33 wherein the structure is substantially asymmetrical about a vertical transverse plane through the fastener receiver.

35. The fastener receiver of claim 33 wherein the base is substantially planar.

36. The fastener receiver of claim 33 wherein the base has a first flat surface and a second flat surface, and further including a fastener element supported on the second flat surface.

37. The fastener receiver of claim 36 wherein the fastener element is a nut having a substantially flat base surface and a plurality of tabs in the base surface.

38. The fastener receiver of claim 37 further including a wall defining at least one opening for receiving a tab of the nut.

39. The fastener receiver of claim 33 wherein the fastener receiver has a height and wherein the base has a thickness approximately equal to one-third the height.

40. The fastener receiver of claim 33 further including walls defining a cavity for receiving a fastener element, wherein the cavity has a height and the base has a height substantially the same as the cavity height.

41. The fastener receiver of claim 40 wherein the cavity has a width greater than or equal to approximately a width of the fastener receiver.

42. The fastener receiver of claim 33 wherein the receiver is non-metal.

43. The fastener receiver of claim 42 wherein the receiver is a polyamide.

* * * * *